(12) United States Patent
Sachs et al.

(10) Patent No.: US 12,184,208 B2
(45) Date of Patent: Dec. 31, 2024

(54) ORIENTATION OF A ROTOR

(71) Applicant: Microchip Technology Incorporated, Chandler, AZ (US)

(72) Inventors: Jason M. Sachs, Chandler, AZ (US); Srikar Deshmukh, Naperville, IL (US)

(73) Assignee: Microchip Technology Incorporated, Chandler, AZ (US)

( * ) Notice: Subject to any disclaimer, the term of this patent is extended or adjusted under 35 U.S.C. 154(b) by 29 days.

(21) Appl. No.: 18/049,189

(22) Filed: Oct. 24, 2022

(65) Prior Publication Data

US 2023/0128564 A1    Apr. 27, 2023

Related U.S. Application Data

(60) Provisional application No. 63/263,030, filed on Oct. 26, 2021.

(51) Int. Cl.
*H02P 21/18* (2016.01)
*H02P 21/22* (2016.01)

(52) U.S. Cl.
CPC ............. *H02P 21/18* (2016.02); *H02P 21/22* (2016.02)

(58) Field of Classification Search
CPC .......... H02P 21/18; H02P 21/22; H02P 6/185; H02P 6/183
USPC ................ 318/400.02, 400.01, 700
See application file for complete search history.

(56) References Cited

U.S. PATENT DOCUMENTS

| | | | |
|---|---|---|---|
| 8,228,013 B2 * | 7/2012 | Liu | H02P 21/14 |
| | | | 318/400.32 |
| 11,456,687 B2 * | 9/2022 | Landsmann | H02P 6/185 |

FOREIGN PATENT DOCUMENTS

CN    111245330 A    6/2020

OTHER PUBLICATIONS

IEEE Transactions on Industrial Informatics, vol. 15, No. 11, Nov. 2019 to Wu et al. (Year: 2019).*
Gabriel F et al: Compensating the influence of the stator resistor and Inverter Nonlinearities in Signal-Injection Based Sensorless Strategies; Vehicle Power and Propulsion Conference, 2009. VPPC '09. IEEE, IEEE, Piscatanay, Sep. 7, 2009 (Sep. 7, 2009), 23 pages.
Holtz,J: "Acquisition of Position Error and Magnet Polarity for Sensorless Control of PM Synchronous Machines," IEE Transactions on Industry Applications, IEEE Service Center, Piscataway, NJ, vol. 44 No.4, Jul. 1, 2008, Mar. 14, 2023.
International Search Report for International Application No. PCT/US2022/078601, mailed Jan. 27, 2023, 6 pages.
International Written Opinion for International Application No. PCT/US2022/078601, mailed Jan. 27, 2023, 8 pages.

(Continued)

*Primary Examiner* — David Luo
(74) *Attorney, Agent, or Firm* — TraskBritt

(57) ABSTRACT

One or more examples relate, generally, to an orientation of a rotor. Some examples relate to an apparatus. The apparatus may include sample-accumulation logic to generate, over a time duration, a value indicative of inductance at least partially responsive to a probe signal provided to a stator of a motor. The apparatus may also include a probe-current discriminator to generate a further value indicative of an orientation of a rotor of the motor at least partially responsive to the generated value. The apparatus may also include update logic to update a process variable of a control loop at least partially responsive to a state of the further value.

21 Claims, 11 Drawing Sheets

(56) References Cited

OTHER PUBLICATIONS

Wu Chao et al: "Rotor Current Oriented Control Method of DFIG-DC System Without Stator Side Sensors", IEEE Transactions on Industrial Electronics, IEEE Service Center, Piscataway, NJ, USA, vol. 67, No. 11, Dec. 5, 2019 (Dec. 5, 2019), 5 pages.
Wu et al. Offline Inductance Identification of IPMSM With Sequence-Pulse Injection, (Nov. 11, 2020), IEEE Transactions on Industrial Electronics, vol. 67, No. 11, 23 pages.

* cited by examiner

ORIENTATION OF A ROTOR

CROSS-REFERENCE TO RELATED APPLICATION

This application claims the benefit of the priority date of U.S. Provisional Patent Application No. 63/263,030, filed Oct. 26, 2021, and titled "ROTOR ANGULAR-POSITION SENSING," the disclosure of which is hereby incorporated herein in its entirety by this reference.

TECHNICAL FIELD

This description relates, generally, to an orientation of a rotor. More specifically, some examples relate to methods, devices, or systems related to determining an orientation of a rotor of a motor, without limitation.

BACKGROUND

Some electric motors, using commutation angle estimators or phase-locked loops may be unable to distinguish between an electrical angle of a rotor and its opposite. In other words, some commutation-angle estimators or phase-locked loops may be unable to differentiate between a first electrical angle of the rotor and a second electrical angle of the rotor that is 180° opposite the first electrical angle.

BRIEF DESCRIPTION THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

Figure 9A:
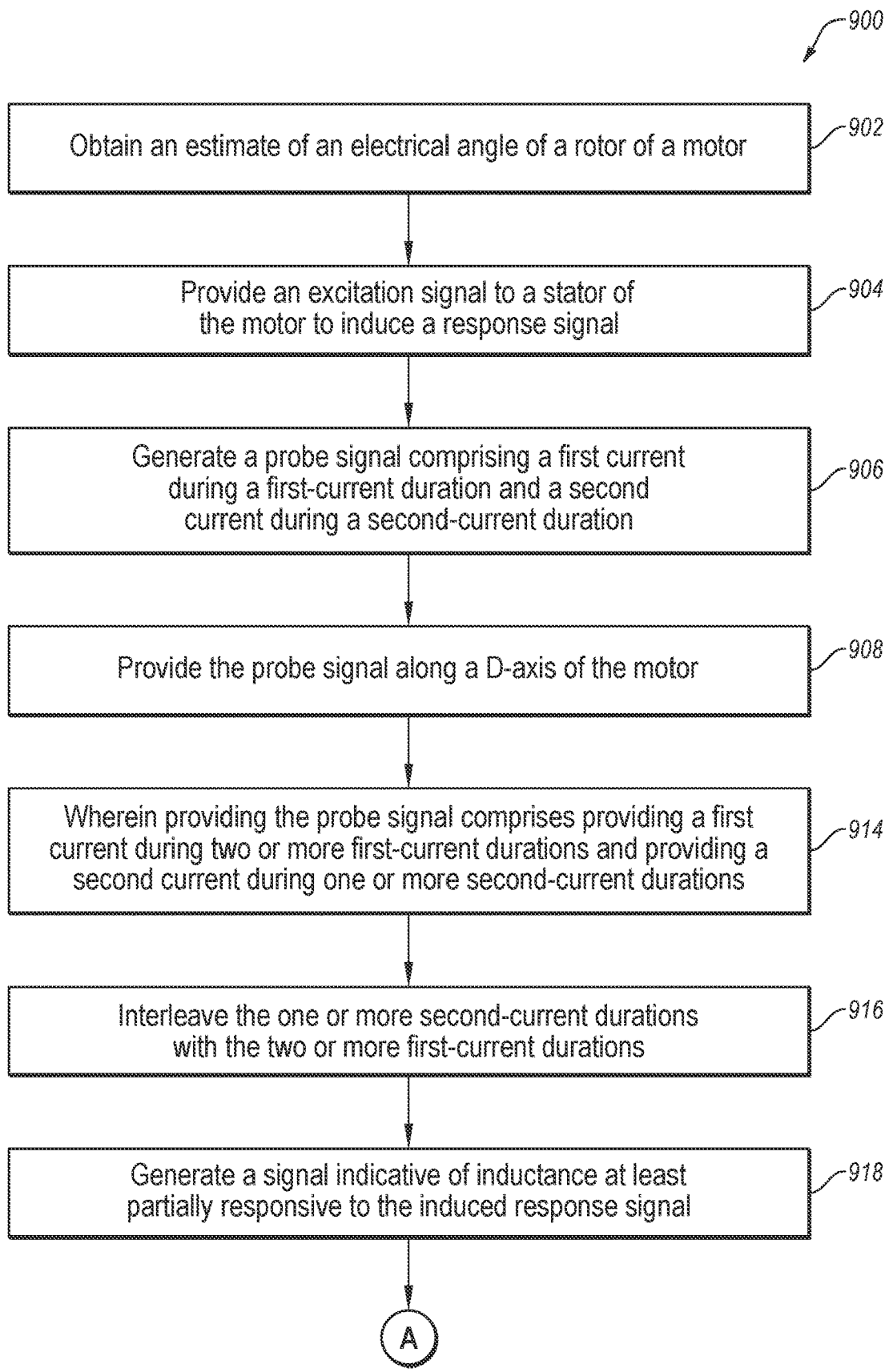
Figure 9B:
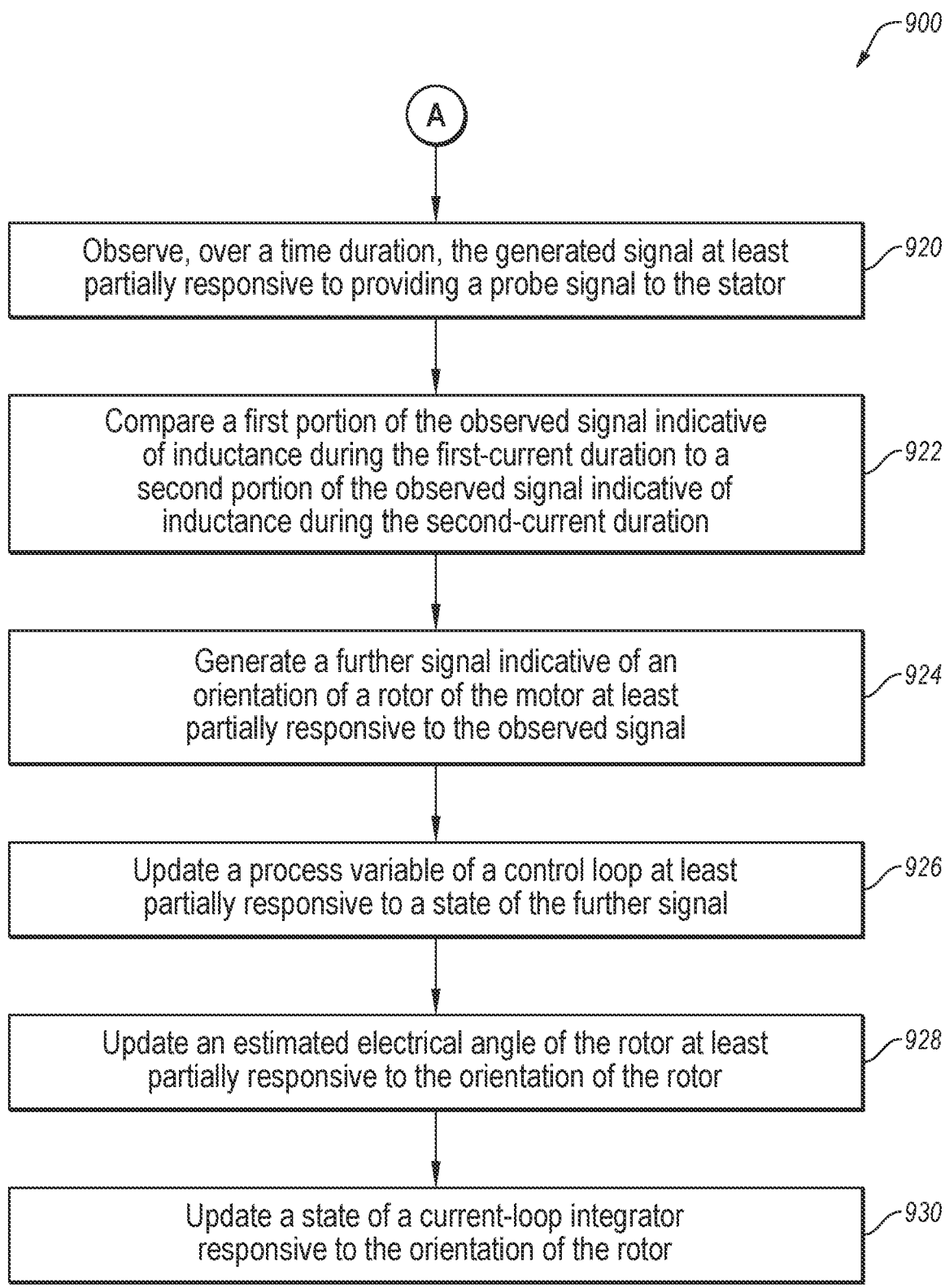

FIG. 9A and FIG. 9B collectively are a flowchart of yet another method 900, according to one or more examples.

Figure 10:
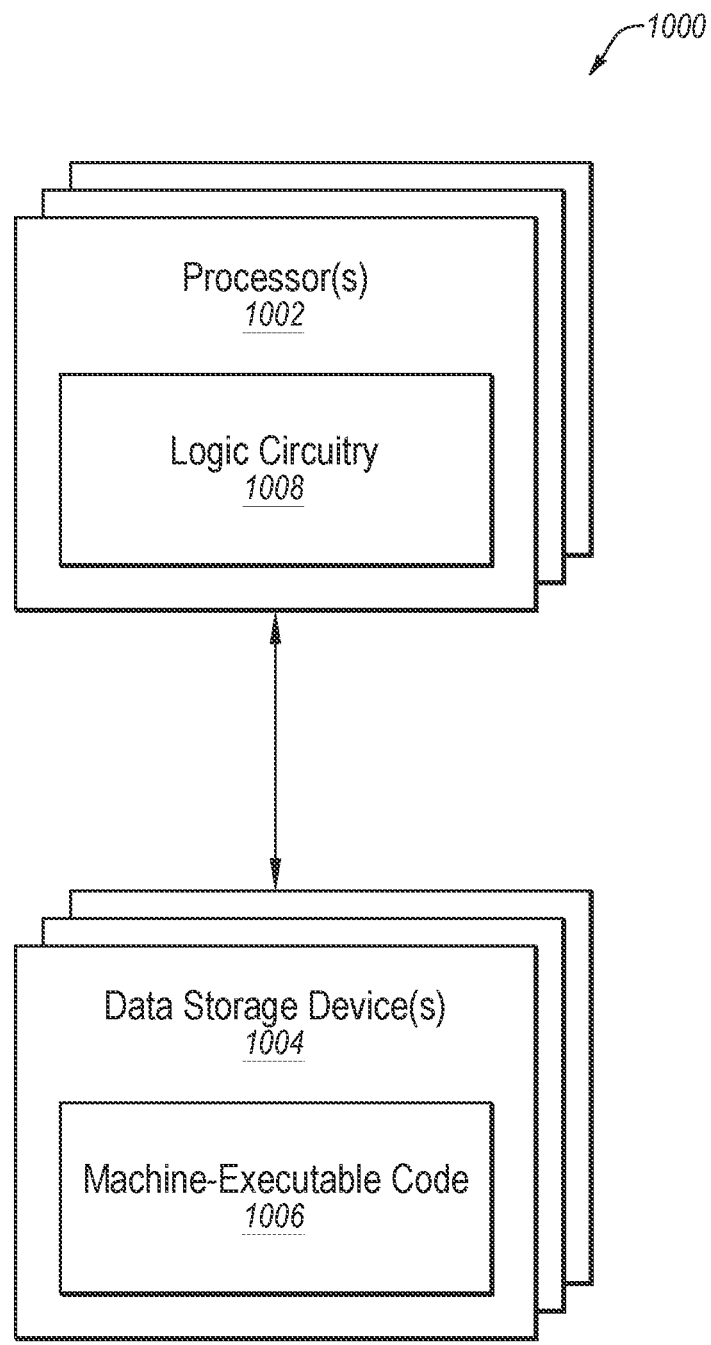

FIG. 10 illustrates a block diagram of an example device that may be used to implement various functions, operations, acts, processes, or methods, in accordance with one or more examples.

DETAILED DESCRIPTION

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are only examples and should not be construed as the only way to implement the present disclosure unless specified otherwise herein. Additionally, block definitions and partitioning of logic between various blocks is an example of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code, without limitation) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Electric motors (including e.g., permanent magnet synchronous motors and brushless direct current electric motors, without limitation) may generate magnetic fields in a stator to cause a rotor to rotate. The stator may include separate windings of wire positioned around an axis in which the magnetic fields are generated in series. The rotor may be, or may include, a magnet arranged to rotate around the axis responsive to the generated magnetic fields. As a non-limiting example, a three-phase electric motor may generate magnetic fields induced by currents flowing through three stator windings radially spaced around the axis. The magnetic fields may variously attract and repel the magnetic poles of the rotor, which may cause the rotor to rotate within the stator windings. The electric motor may supply varying degrees of current to the various stator windings at different times such that the generated magnetic fields will cause the rotor to rotate.

A rotating frame of reference may be defined based on the rotor. In the rotating frame of reference, a direct axis (or "d-axis") may be defined in the direction of one of the poles (e.g., the north pole, without limitation) of the magnet of the rotor from the axis. A quadrature axis (or "q-axis") may be defined 90° ahead (in the direction of rotation) of the d-axis. In order to generate maximum torque, the stator should generate magnetic fields in stator windings according to the q-axis. For example, for maximum positive torque, the maximum magnetic field in the stator windings should align with the positive q-axis. In other words, the q-axis component of the magnetic field provides torque.

In the present disclosure, references to angles and/or degrees refer to electrical angles unless otherwise stated. In the present disclosure, references to angular positions may refer to one or both of an electrical angle or a mechanical angle. In the present disclosure, the term "commutation" (and like terms) may refer to the process of translating between an electrical angle of the rotor (or the d-axis or q-axis) and amounts of current to provide to different stator windings. For example, a commutator of an electric motor may provide current to stator windings such that the magnetic field is aligned with the q-axis. As another example, a commutation angle may refer to the angle of the magnetic field generated by the stator windings according to the various currents provided thereto relative to a stationary reference, for example one of the stator windings.

To control the rotor, it may be important to know the angular position of the rotor (i.e., including the electrical angle and/or the mechanical angle of the rotor) relative to the stator windings. For example, knowing the angular position of the rotor may be relevant to determining which of the stator windings to supply with which amounts of positive and negative current in order to provide torque to the rotor, in the correct direction, while minimizing the current. For example, knowing the angular position of the rotor, with zero angle error, may maximize the torque for a given current and minimize the current for a given amount of torque. Using an accurate angular-position estimate may avoid reverse rotation e.g., which may be the result of a phase-locked loop (PLL) locking onto an opposite error (e.g., a 180° error). Additionally, knowing the angular position of the rotor may be important when the rotor is at zero or low rotational velocities, such that the back-electromotive force (emf) voltage induced in the stator windings provides insufficient signal to be able to use simpler back-emf-based sensorless techniques. Additionally, knowing the angular position of the rotor may be important to minimize disturbances to control of the stator currents and rotor velocity caused by time-varying errors in the estimate of angular position.

An electrical motor may be included in a motor drive. The motor drive may provide control signals to the motor.

One way to determine the angular position of the rotor (the electrical angle and/or the mechanical angle) is to include a sensor in the motor drive to determine the angular position of the rotor. There may be disadvantages to including a sensor to determine the position of the rotor. For example, a sensor may be costly, add to complexity of the electric motor, and/or be a source of reliability issues within the motor.

Some motor drives may exclude sensors. Such motor drives may include commutation angle estimators (e.g., sensorless commutation-angle estimators including e.g., saliency-based sensorless commutation-angle estimators, without limitation) that may estimate an electrical angle of the rotor. Further, some motor drives may include a phase-locked loop to ascertain and control an angular position of the rotor (including the mechanical and/or the electrical angle of the rotor).

However, some motor drives, using commutation angle estimators or phase-locked loops may be unable to distinguish between an electrical angle of a rotor and its opposite. In other words, some commutation-angle commutation angle estimators or phase-locked loops may be unable to differentiate between a first electrical angle of the rotor and a second electrical angle of the rotor that is 180° opposite the first electrical angle.

In the present disclosure, the term "half-cycle error" may refer to a difference between an actual electrical angle of the rotor and an estimated electrical angle of the rotor, modulo 180°. Using some commutation angle estimators, it may not be possible to determine whether the estimated electrical angle of the rotor is accurate, or 180° from accurate. Excluding the uncertainty regarding whether the estimated electrical angle is off by 180° or not, the estimated electrical angle may be substantially accurate. As a non-limiting example, a rotor may be at 27° (electrically). A commutation angle estimator may estimate the rotor to be at 34°. In such an example, the half-cycle error may be −7 degrees. Alternatively, if the rotor is at 27°, and the estimated rotor angle is 214°, the half-cycle error would also be −7 degrees.

Some examples may relate to determining an orientation of a rotor in an electric motor (e.g., a sensorless electric motor, without limitation). In the present disclosure, the term "orientation" may refer to a determination that an estimated electrical angle is accurate or 180° off. As a non-limiting example, a commutation angle estimator may determine an estimated electrical angle of the rotor. Some examples may determine whether the estimated electrical angle of the rotor is accurate, or 180° off, in other words, some examples may determine an orientation of the rotor. After a determination has been made regarding whether the estimated electrical angle is accurate, or 180° off, the estimated electrical angle may be updated, e.g., at the commutation angle estimator or at a phase-locked loop. In some cases, an orientation indication may be generated. An orientation indication may be, or may include, an indication of whether the estimated electrical angle is accurate or 180° off.

Figure 1:
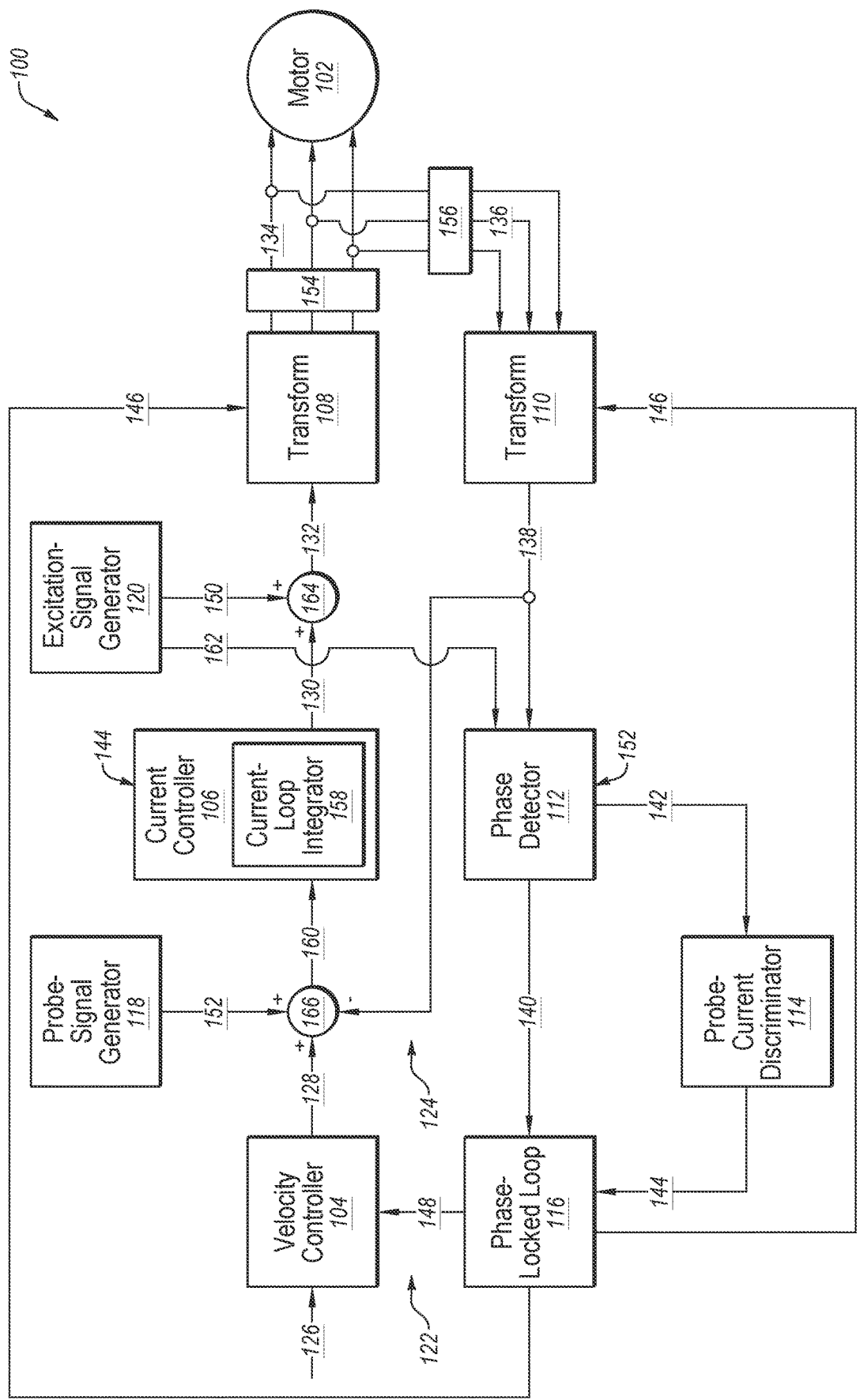
FIG. 1 is a functional block diagram illustrating an apparatus according to one or more examples.

FIG. 1 is a functional block diagram illustrating an apparatus 100 according to one or more examples. Apparatus 100 may, among other things, determine whether an estimated electrical angle of the rotor is accurate, or 180° off. In some cases, apparatus 100 may, among other things, generate an orientation indication indicative of whether the estimated electrical angle is accurate, or 180° off.

Apparatus 100 may include a motor 102 (e.g., including a stator and a rotor, without limitation, neither of which is illustrated in FIG. 1). Apparatus 100 may include a velocity controller 104 to generate a current command signal 128 to control motor 102 according to a first feedback loop 122 (i.e., "velocity loop 122"), such that motor 102 achieves a rotational velocity according to a velocity-command signal 126. Apparatus 100 may include a current controller 106 to generate a voltage command signal 130 to control motor 102 according to a second feedback loop 124 (i.e., a "current loop 124").

Apparatus 100 may include an excitation-signal generator 120 to generate an excitation signal 150 and/or a unit-excitation signal 162. Excitation signal 150 may be related to unit-excitation signal 162. For example, unit-excitation signal 162 may be a unit square wave, without limitation. Excitation signal 150 may be unit-excitation signal 162 multiplied by an appropriate amplitude, without limitation. Excitation signal 150 and/or unit-excitation signal 162 may, as a non-limiting example, include a square wave having a frequency. The frequency of the square wave may be on the order of kilohertz (kHz), e.g., 10 kHz, without limitation.

Apparatus 100 may include a transform 108 to generate multi-phase output signals 134 (e.g., an A, B, and C signal for three stator windings of a three-phase motor, without limitation) for a stator of motor 102 responsive to a control signal 132 (which control signal 132 may be a summation of a voltage command signal 130 and excitation signal 150, which summation may be provided by an adder 164). Apparatus 100 may include a driver circuitry 154 to apply multi-phase output signals 134 to terminals of the stator of motor 102. Driver circuitry 154 may include, for example, a pulse-width modulator to provide voltage (or current) to the stator windings responsive to outputs of transform 108.

Apparatus 100 may include sensors 156 to obtain a multi-phase response signal 136 from inputs to motor 102. Apparatus 100 may include a transform 110 to generate a d/q response signal 138 (i.e., "Idq 138") based on the multi-phase response signal 136. Idq 138 may be, or may include, a signal indicative of current in the stator windings of motor 102, relative to the rotating frame of reference, comprising d-axis and q-axis components.

Apparatus 100 may include a phase detector 112, which may receive Idq 138 and unit-excitation signal 162 and may generate a demodulated q-axis current 140 (i.e., "delta Iq 140") and a demodulated d-axis current 142 (i.e., "delta Id 142") responsive to Idq 138 and unit-excitation signal 162.

In the present disclosure, uses of "d" and "q" (e.g., in "Idq 138," "delta Iq 140," and "delta Id 142," without limitation) may refer to an estimated frame of reference of the rotor. As a non-limiting example, transform 110 may receive theta 146 from phase-locked loop 116. Theta 146 may be an estimated electrical angle of the rotor. Transform 110 may translate from the ABC frame of reference into an estimated d/q frame of reference at least partially based on theta 146. Similarly, transform 108 may translate from a d/q frame of reference at least partially based on theta 146.

Delta Id 142 may be, or may include, a signal indicative of d-axis current in the stator windings of motor 102 over time. In particular, delta Id 142 may be indicative of an amplitude of the d-axis current in the stator windings. The amplitude of the d-axis current in the stator windings may be responsive to excitation signal 150 applied along the d-axis. Delta Id 142 may be obtained by phase detector 112 by multiplying the d-axis current (which may be determined from Idq 138 as the d-axis component of Idq 138) by unit-excitation signal 162 and filtering the result. Consumers of delta Id 142 accumulate or average delta Id 142 over a time period. The time period may correspond to operations of probe-signal generator 118. For example, probe-signal generator 118 may provide a first signal during a first time period and probe-current discriminator 114 may accumulate delta Id 142 during the first time period. After the first time period, probe-current discriminator 114 may determine one or more values representative of delta Id 142 (e.g., as accumulated or averaged) during the first time period. Thereafter, probe-current discriminator 114 may accumulate delta Id 142 during a second time period (which second time period may correspond to time period during which probe-signal generator 118 is generating a second signal).

Delta Iq 140 may be, or may include a signal indicative of q-axis current in the stator windings of motor 102 over time. In particular, delta Iq 140 may be indicative of an amplitude of the q-axis current in the stator windings. The amplitude of the q-axis current in the stator windings may be responsive to the excitation voltage applied along the d-axis. Delta Iq 140 may be obtained by phase detector 112 by multiplying the q-axis current (which may be determined from Idq 138 as the q-axis component of Idq 138) by unit-excitation signal 162 and filtering the result. Consumers of delta Iq 140 accumulate or average delta Iq 140 over a time period. The time period may correspond to operations of probe-signal generator 118. For example, probe-signal generator 118 may provide a first signal during a first time period and probe-current discriminator 114 may accumulate delta Iq 140 during the first time period. After the first time period, probe-current discriminator 114 may determine one or more values representative of delta Iq 140 (e.g., as accumulated or averaged) during the first time period. Thereafter, probe-current discriminator 114 may accumulate delta Iq 140 during a second time period (which second time period may correspond to time period during which probe-signal generator 118 is generating a second signal).

Apparatus 100 may include probe-current discriminator 114 to generate an orientation indication 144 responsive to delta Id 142. Apparatus 100 may include a phase-locked loop 116 to generate an estimated electrical angle of the rotor 146 (i.e., "theta 146") responsive to delta Iq 140 and/or to update theta 146 responsive to orientation indication 144. Phase-locked loop 116 may provide theta 146 to transform 108 and to transform 110. Phase-locked loop 116 may provide a velocity-feedback signal 148 to velocity controller 104. Apparatus 100 may include a probe-signal generator 118 to generate a probe signal 152.

Motor 102 may be any suitable electric motor including as non-limiting examples, permanent magnet synchronous motors and brushless direct current electric motors. Motor 102 may include any suitable number of stator windings. As non-limiting examples, motor 102 may be a two-phase electric motor, a three-phase electric motor, or a four-phase electric motor.

Velocity controller 104 may receive velocity-command signal 126, which may indicate a desired rotational velocity of the rotor of motor 102. Velocity controller 104 may generate current command signal 128 to control motor 102 responsive to velocity-feedback signal 148 received from phase-locked loop 116 in velocity loop 122 and velocity-command signal 126 such that the rotor of motor 102 achieves the rotational velocity indicated in velocity-command signal 126. Velocity controller 104 may be, or may include, any suitable logic or processor e.g., a programmable logic controller (PLC), an application specific integrated circuit (ASIC), or a processor, without limitation.

Current controller 106 may receive an error signal 160 that is a summation of current command signal 128, Idq 138, and probe signal 152, which summation may be performed by an adder 166. In, or prior to, the summation, Idq 138 may be multiplied by −1, and is therefore illustrated as a negative input to adder 166. Current controller 106 may modify the received error signal 160 according to parameters and feedback of current loop 124 to generate voltage command signal 130. As a non-limiting example, current controller 106 may prevent current in apparatus 100 from exceeding a threshold. Current controller 106 may be, or may include, any suitable logic or processor, e.g., a PLC, an ASIC, or a processor, without limitation.

Current controller 106 may include one or more current-loop integrators 158. Current-loop integrators 158 may take error signal 160 (e.g., a commanded current (e.g., as indicated by current command signal 128) minus a measured current (e.g., as indicated by Idq 138)) as input, which may be a current signal, and may provide a voltage output (e.g., indicated by voltage command signal 130). Current-loop integrators 158 may integrate the product of integral gain ($K_i$) times current error signal 160, over time. For example, $V_{dqi} = \int K_i \tilde{I}_{dq} \, dt$ where $V_{dqi}$ is the integrator output voltage (including both components d and q as a vector), and $\tilde{I}_{dq}$ is the current error signal 160, also including both components d and q as a vector. When probe-signal generator 118 provides probe signal 152, the current error signal 160 may additionally include a probe signal 152.

Transform 108 may receive theta 146 and control signal 132, which control signal 132 may be the summation of voltage command signal 130 and excitation signal 150 as provided by adder 164, and may generate multi-phase output signals 134 responsive to control signal 132 and theta 146. Transform 108 may translate between a d/q frame of reference (e.g., a d-axis/q-axis frame of reference, without limitation) of control signal 132 and a multi-phase frame of reference of multi-phase output signals 134 (e.g., an ABC frame of reference for a three-phase motor, without limitation). As a non-limiting example, transform 108 may include inverse Park and Clarke transforms to translate from the d/q frame of reference of control signal 132 to an ABC frame of reference to provide individual multi-phase output signals 134 to each of the stator windings of motor 102. Transform 108 may additionally include a realization stage (for example, space vector modulation or zero-sequence modulation) to adjust common-mode offset of the multi-phase output signals 134 and ensure they are limited to be within realizable voltage limits.

Sensors 156 may measure multi-phase response signal 136 by measuring current (or voltage) at the inputs to the stators of motor 102. In particular, in cases where driver circuitry 154 provides multi-phase output signals 134 as voltage to the stator windings of motor 102, multi-phase response signal 136 may be a measure of current. Alternatively, in cases where driver circuitry 154 provides multi-phase output signals 134 as current to the stator windings of motor 102, multi-phase response signal 136 may be a measure of voltage. Sensors 156 may include an analog-to-digital converter to convert measured analog values at the inputs of the stator windings of motor 102 into digital values. Transform 110 may translate from the ABC frame of reference of the inputs of the stator windings of motor 102, i.e., of the multi-phase response signal 136, to the d/q frame of reference. As a non-limiting example, transform 110 may include Park and Clarke transforms to translate the measured multi-phase response signal 136 into Idq 138. Further, transform 110 may include gain or offset compensation to correct for gain and offset errors in the current measurement circuitry of sensors 156. Transform 110 may generate Idq 138 responsive to multi-phase response signal 136. As indicated above, Idq 138 may be a measure of current of multi-phase response signal 136 with both a d-axis component and a q-axis component.

Phase detector 112 may generate delta Iq 140 and delta Id 142 based on Idq 138 and in some cases based additionally on unit-excitation signal 162. Delta Iq 140 may be, or may include, multiple values of the q-axis component of Idq 138 accumulated over time. Similarly, Delta Id 142 may be, or may include, multiple values of the d-axis component of Idq 138 accumulated over time.

Phase-locked loop 116 may determine theta 146, which may be an estimated electrical angle of the rotor based on delta Iq 140. Phase-locked loop 116 may provide theta 146 to transform 108 and to transform 110 so that transform 108 and transform 110 may use theta 146 to translate between the d/q frame of reference and the ABC frame of reference. Phase-locked loop 116 may further generate velocity-feedback signal 148 and provide velocity-feedback signal 148 to velocity controller 104. Phase-locked loop 116 may be part of velocity loop 122 that may track a rotational position and/or velocity of the rotor of motor 102 by observing delta Iq 140. Phase-locked loop 116 may additionally control a rotational position and/or velocity of the rotor of motor 102 by providing velocity-feedback signal 148.

Probe-signal generator 118 may generate probe signal 152. Probe signal 152 may be, or may include, one or more first current durations during which probe signal 152 is, or includes, a first current (e.g., a positive current) along the d-axis and one or more second current durations during which probe signal 152 is, or includes, second current (e.g., a negative current) along the d-axis.

Figure 2:
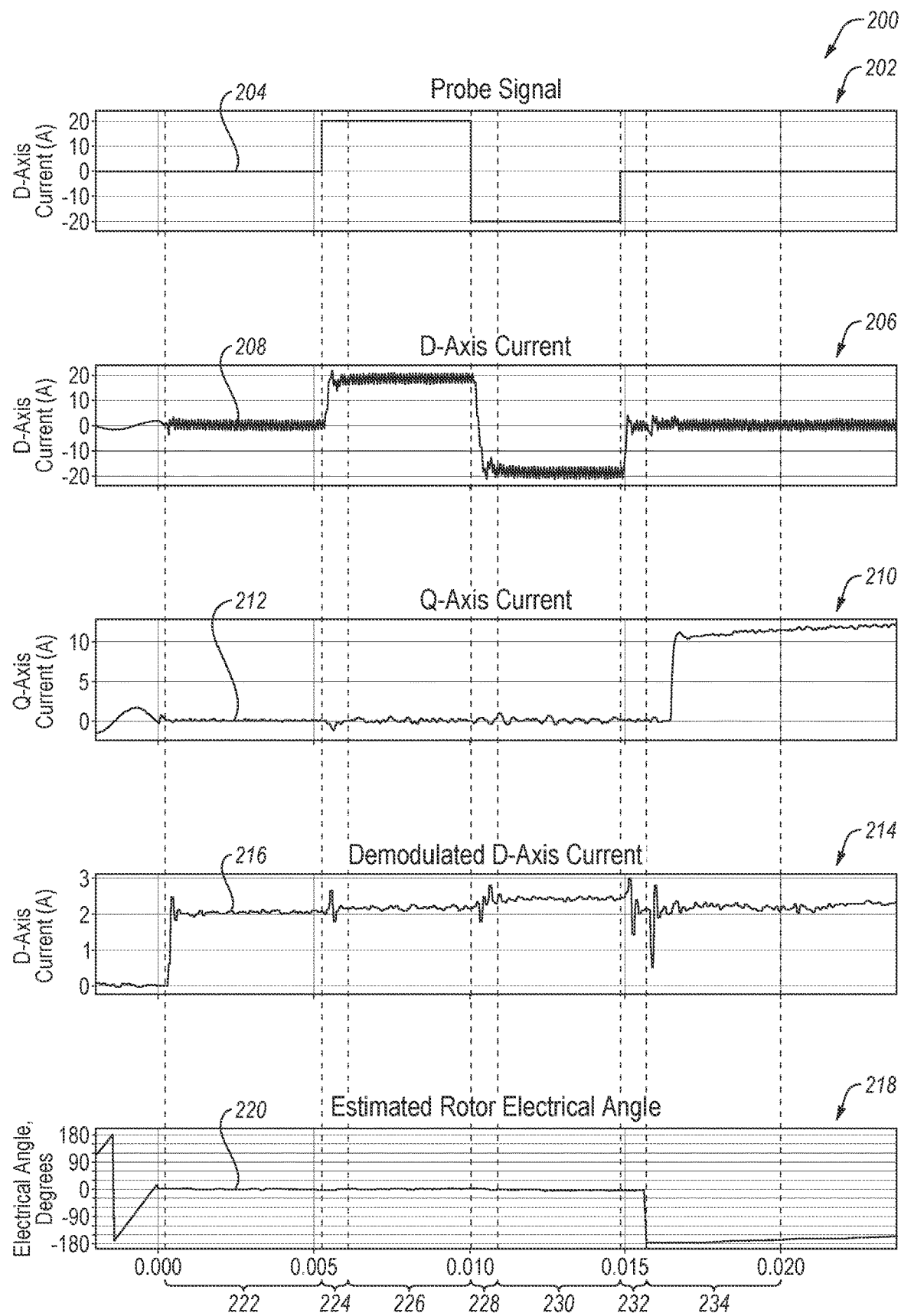
FIG. 2 is a functional block diagram illustrating graphs according to one or more examples.

FIG. 2 is a functional block diagram illustrating graphs 200 according to one or more examples. Graphs 200 collectively illustrate aspects of some example operations of apparatus 100 of FIG. 1. As a non-limiting example, one or more of graphs 200 may be an illustration of an example signal of apparatus 100 during operation of apparatus 100.

Graphs 200 include graph 202 illustrating a probe signal 204. Probe signal 204 may be one portion of a current to be provided to a stator along the estimated d-axis of the motor. Probe signal 204 may be an example of a d-axis portion of probe signal 152 of FIG. 1. Probe signal 152 may be a vector, to match the other addends current command signal 128 and Idq 138, with d- and q-axis components, but by design its q-axis component may be zero, so that probe signal 152 may contain only the d-axis component, as illustrated by probe signal 204. As described above in relation to FIG. 1, adder 166 sums probe signal 152, current command signal 128, and inverted Idq 138 to generate current error signal 160. Adder 166 provides error signal 160 to current controller 106. Current controller generates voltage command signal 130 responsive to error signal 160 (which is based, at least in part on probe signal 152 when probe-signal generator 118 provides probe signal 152 to adder 166). Adder 164 sums voltage command signal 130 and excitation signal 150 to generate control signal 132, which is then transformed (by transform 108 (responsive to theta 146)) and applied to stator of motor 102 (by driver circuitry 154).

Graphs 200 include graph 206 illustrating a d-axis current 208. D-axis current 208 may be a current in the stator along the estimated d-axis of the motor. D-axis current 208 may be an example of the d-axis component of Idq 138 of FIG. 1.

Returning now to FIG. 2, graphs 200 includes graph 210 illustrating a q-axis current 212. Q-axis current 212 may be a current in the stator along the estimated q-axis of the rotor. Q-axis current 212 may be an example of the q-axis component of Idq 138 of FIG. 1.

Graphs 200 include graph 214 illustrating a demodulated d-axis current 216. Demodulated d-axis current 216 may be an example of d-axis current 208 after synchronous demodulation using unit-excitation signal 162. For example, the excitation signal (e.g., excitation signal 150 of FIG. 1) may have been derived from a unit square wave (e.g., unit-excitation signal 162) by multiplying by an appropriate amplitude, without limitation. The d-axis current 208 may be multiplied by unit-excitation signal 162 to obtain the demodulated d-axis current 216. In some cases, a delay of 1-2 sampling periods may be used to compensate for delays from the output circuitry of driver 154 and the input circuitry of sensors 156. Additionally, in some cases, d-axis current (after being multiplied by the unit-excitation signal 162 and/or after delay compensation) may be filtered, e.g., using a low-pass filter including, for example, be a combination of finite-impulse response (FIR) and infinite-impulse response (IIR) filters. Delta Id 142 of FIG. 1 may be an example of multiple samples of demodulated d-axis current 216 accumulated over time.

Graphs 200 include graph 218 illustrating an estimated rotor electrical angle 220, in degrees. Estimated rotor electrical angle 220 may be indicative of an estimated angular position of a rotor of a motor (e.g., motor 102 of FIG. 1, without limitation). Estimated rotor electrical angle 220 may be an example of theta 146 of FIG. 1.

Graphs 200 are related. As a non-limiting example, graphs 200 illustrates signals that may be measured, estimated, or derived concurrently during operations according to examples. Thus, all of graphs 200 share a time scale and events and time periods may be common to, or reflected in, more than one of graphs 200. As a non-limiting example, graphs 200 illustrate signals and the estimated position of the rotor during a first time period 222, a second time period 224, a third time period 226, a fourth time period 228, a fifth time period 230, a sixth time period 232, and a seventh time period 234.

Example operations of apparatus 100 of FIG. 1 are described with reference to FIG. 1 and to graphs 200 of FIG. 2 and time periods of FIG. 2.

During first time period 222, excitation-signal generator 120 may generate excitation signal 150, which excitation signal 150 may be added to voltage command signal 130, transformed by transform 108, and applied to the stator of the motor (e.g., by driver circuitry 154). The excitation signal 150 may be, or may include, a square wave having a frequency (e.g., 10 kHz, without limitation). The effects of excitation signal 150 on d-axis current 208 can be seen in the high-frequency oscillations of d-axis current 208 during first time period 222. Providing excitation signal 150 during first time period 222 may allow phase-locked loop 116 to determine or lock onto estimated electrical angle of the rotor, i.e., theta 146. Additionally or alternatively, providing excitation signal 150 during first time period 222 may establish a baseline for demodulated d-axis current 216 against which demodulated d-axis current 216 during third time period 226 or fifth time period 230 may be compared, e.g., to detect errors. Providing a high-frequency oscillating signal along the d-axis of the motor may not cause the rotor to rotate (e.g., as can be seen in estimated rotor electrical angle 220 and q-axis current 212 during first time period 222, without limitation) because the inductance of the stator filters out most of the high-frequency oscillations in the current, and because the excitation signal 150 is along the d-axis (non-torque-producing). Even if the excitation signal 150 were to cause some response along the q-axis, e.g., if the half-cycle error is not near zero, the resulting torque is also at high frequency and is filtered out by the mechanical inertia of the rotor. Generating excitation signal 150 during first time period 222 and providing excitation signal 150 to the motor during first time period 222 is optional. In other examples, operations of apparatus 100 may proceed without having provided excitation signal 150 at first time period 222.

During second time period 224, probe signal 204 may be generated or begin to be applied along a d-axis of the motor. Third time period 226 may begin a time duration after second time period 224, e.g., to allow d-axis current 208 to settle responsive to probe signal 204, without limitation. During third time period 226, probe signal 204 may continue to be applied along the d-axis of the motor. Probe signal 204 may be a first current (e.g., a positive current) during second time period 224 and third time period 226, thus second time period 224 and third time period 226 may be considered a first-current duration (e.g., positive-current durations). During second time period 224, excitation signal 150 may or may not be provided. During third time period 226 excitation signal 150 may be provided. The effects of probe signal 204 on d-axis current 208 can be seen by the increase in d-axis current (e.g., nearly 20 amperes (A), without limitation) during second time period 224 and third time period 226. However, because probe signal 204 (as applied to the stator) is aligned with the d-axis and there is no q-axis current (as can be seen in q-axis current 212 during second time period 224 and third time period 226), the rotor may not substantially rotate (as can be seen in estimated rotor electrical angle 220 during second time period 224 and third time period 226). During third time period 226, samples of d-axis current 208 or samples of demodulated d-axis current 216 may be obtained and stored.

During fourth time period 228, probe signal 204 may switch from being a first current (e.g., a positive current), to being a second current (e.g., a negative current) along a d-axis of the motor. Fifth time period 230 may begin a time duration after fourth time period 228, e.g., to allow d-axis current 208 to settle responsive to probe signal 204 switching polarity, without limitation. During fifth time period 230, probe signal 204 may continue to be applied along the d-axis of the motor. Probe signal 204 may be a second current (e.g., a negative current) during at least a portion of fourth time period 228 and during fifth time period 230, thus fourth time period 228 and fifth time period 230 may be considered a second-current duration (e.g., a negative current duration). During fourth time period 228 and during fifth time period 230, excitation signal 150 may be provided, e.g., to allow the PLL to remain locked.

A magnetic field in a motor may include the sum of the field due to the rotor magnet and the field due to stator currents. If the magnetic field due to the rotor magnet and the magnetic field due to the stator currents are in the same direction (along the positive d-axis, since this is defined as the direction of the rotor magnetic field) then the magnetic fields reinforce and drive the iron deeper into magnetic saturation, which may decrease the d-axis inductance of the stator. If the magnetic fields are in opposite directions, they cancel partially, and drive the iron away from saturation. An inductive load (e.g., the stator) responds to an excitation voltage of constant amplitude and frequency, with an oscillation of current at the excitation frequency, where the amplitude of oscillation is inversely proportional to inductance. Because the excitation signal 150 exhibits a fixed excitation amplitude and frequency, the amplitude of oscillation of the d-axis current (e.g., as illustrated by d-axis current 208) is inversely proportional to d-axis inductance. So if the d-axis inductance decreases, then the measured d-axis current oscillation will increase, and the demodulated d-axis current signal will increase. Thus, demodulated d-axis current 216, including during third time period 226 and fifth time period 230, may be indicative of inductance of the stator.

The excitation signal may cause incremental changes in magnetic field to be observable around a more slowly changing bias point. Thus the excitation signal may cause the demodulated signal indicative of stator inductance to be observable. The probe signal may change that bias point, e.g., to two different levels, using the first current and the second current. One of these levels may push the stator iron further into magnetic saturation, which causes the demodulated d-axis current 216 to increase, as an indicator of this increased magnetic saturation. The determination of which level (first or second current) causes the larger increase in demodulated d-axis current, indicates the direction of the true d-axis. For example, if the larger increase in demodulated d-axis current 216 corresponds to providing current along the positive estimated d-axis the angular-position estimate may be correct and may be validated. Alternatively, if the larger increase in demodulated d-axis current 216 corresponds to providing current along the negative estimated d-axis the angular position estimate may be off by 180 degrees and may be corrected.

For example, during third time period 226, the positive d-axis current provided to the stator (responsive to probe signal 204) may generate a magnetic field opposite of the magnetic field of the rotor. The two magnetic fields may, at least partially cancel. In contrast, during fifth time period 230, the negative d-axis current provided to the stator (responsive to probe signal 204) may generate a magnetic field in the same direction as the magnetic field of the rotor, which may result in stronger magnetic field. The difference in the demodulated d-axis current 216 from third time period 226 to fifth time period 230 may reflect whether the d-axis current provided to the stator (responsive to probe signal 204) increased or decreased the amplitude of the magnetic field.

Based on the difference between demodulated d-axis current 216 during fifth time period 230 and demodulated d-axis current 216 during third time period 226, it may be determined that the negative d-axis current of probe signal 204 during fifth time period 230 is aligned with the magnetic poles of the rotor. Thus, based on demodulated d-axis current 216 during fifth time period 230 and third time period 226, an orientation of the rotor can be determined. In particular, according to the example of FIG. 2, the estimated rotor electrical angle 220 is corrected by 180 degrees so the positive d-axis is aligned with the magnetic poles of the rotor. For example, during, or at the end of, sixth time period 232 estimated rotor electrical angle 220 is adjusted from approximately zero degrees to approximately 180 degrees.

Referring to apparatus 100 of FIG. 1, phase detector 112 may accumulate samples representative of the d-axis current over time, thereby generating delta Id 142. Phase detector 112 may further multiply the samples by unit-excitation signal 162 and/or filter the samples when generating delta Id 142. Probe-current discriminator 114 may compare the samples of delta Id 142 over time e.g., comparing delta Id 142 during one or more first current durations (e.g., positive-current durations) of probe signal 152 to delta Id 142 during one or more second-current durations (e.g., negative-current durations) of probe signal 152, without limitation. Based on the comparison, probe-current discriminator 114 may determine whether the rotor is oriented in the direction of the estimated electrical angle or 180° off the estimated electrical angle. If probe-current discriminator 114 determines that the rotor is oriented in the direction of the estimated electrical angle, probe-current discriminator 114 may do nothing or may provide orientation indication 144 indicative that the estimated electrical angle is correct (or correct within 180°). If probe-current discriminator 114 determines that the rotor is oriented 180° off the direction of the estimated electrical angle, probe-current discriminator 114 may provide orientation indication 144 indicative that the estimated electrical angle is incorrect or off by 180°.

Returning to FIG. 2, during sixth time period 232, probe signal 204 may cease to be generated or cease to be provided to the motor 102. During sixth time period 232, d-axis current 208 may be allowed to settle.

At the beginning of seventh time period 234, the estimated rotor electrical angle 220 may be updated i.e., from about 0° to about 180° responsive to the determination that the estimated electrical angle was 180° off. The updating of estimated rotor electrical angle 220 may, or may not, be delayed until after sixth time period 232. Estimated rotor electrical angle 220 may be updated any time after a determination is made regarding estimated rotor electrical angle 220 being 180° off.

As a non-limiting example, referring again to apparatus 100 of FIG. 1, responsive to orientation indication 144, phase-locked loop 116 may update or correct the estimated electrical angle. As a non-limiting example, phase-locked loop 116 may update theta 146.

Additionally, responsive to orientation indication 144 indicating that the estimated electrical angle is 180° off, apparatus 100 may invert current-loop integrators 158 so as to not interrupt continuous applied voltage. For example, if the commutation angle is adjusted by 180 degrees, this suddenly inverts the voltage applied to the motor, presenting a disturbance to current controller 106. (The current loop 124 can react to this disturbance, but it may take time, and is undesirable.) To mitigate this disturbance, current-loop integrators 158 are inverted when the commutation angle is adjusted by 180 degrees. This maintains an effective continuity in the integrator output voltage as seen by the motor.

Figure 3:
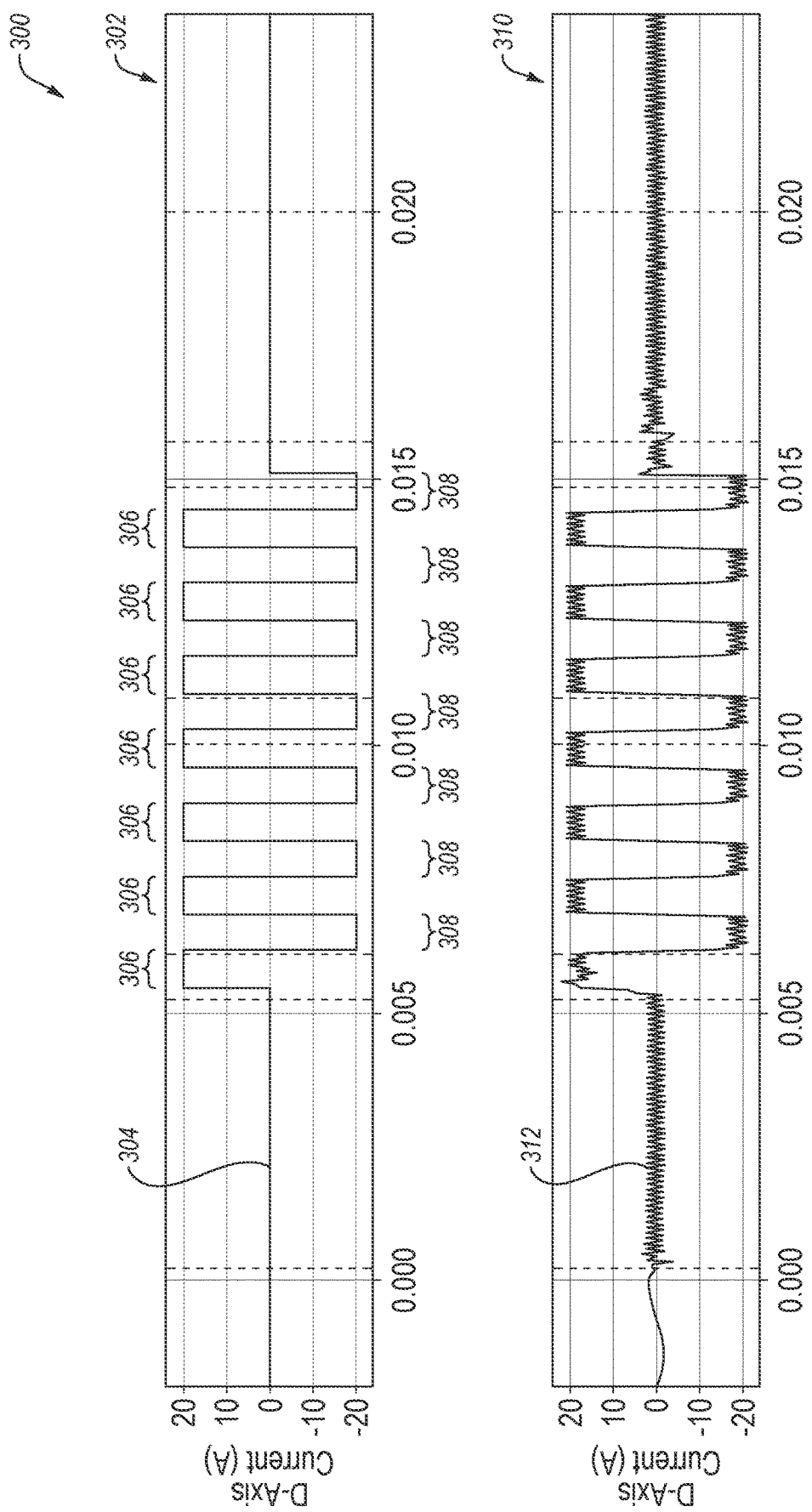
FIG. 3 is a functional block diagram illustrating additional graphs according to one or more examples.

FIG. 3 is a functional block diagram illustrating additional graphs 300 according to one or more examples. Graphs 300 collectively illustrate aspects of some example operations of apparatus 100 of FIG. 1.

Graphs 300 include graph 302 illustrating a probe signal 304. Probe signal 304 may be one portion of a current provided to a stator along the estimated d-axis of the motor. Probe signal 304 may be an example of the d-axis portion of probe signal 152 of FIG. 1.

Graphs 300 include graph 310 illustrating a d-axis current 312. D-axis current 312 may be a current in the stator along the estimated d-axis of the motor. D-axis current 312 may be an example of the d-axis component of Idq 138 of FIG. 1.

Probe signal 304 may be an alternative probe signal to probe signal 204 of FIG. 2. Probe signal 304 has similarities to, and difference from, the probe signal 204. A difference between probe signal 304 and probe signal 204 is that probe signal 304 affects the d-axis current 312 during multiple first-current durations 306 (e.g., positive-current durations) and multiple second-current durations 308 (e.g., negative current durations) whereas probe signal 204 has one first-current duration (e.g., one positive-current duration) and one second-current duration (e.g., one negative current duration).

Including multiple first-current durations 306 (e.g., positive-current durations) interleaved with multiple second-current durations 308 (e.g., negative current durations) may cause less of a torque disturbance and which may minimize the amount of undesirable motion of the rotor. For example, if there are errors in the estimated angle (for example, a 10-15 degree error between the estimated angle and an actual angle), then the current of probe signal 204 may cause significant motor torque. Applying current of probe signal 304 at a higher frequency by reversing it rapidly may cause less of a torque disturbance and minimize the amount of undesirable motion.

Alternatively, a probe signal may be provided that has two values of the same sign. For example, rather than providing a probe signal (such as probe signal 204 or probe signal 304) having a positive value during first-current durations and a negative value during second-current durations, a probe signal may include two (or more) different positive values, e.g., a first positive value during first-current durations and a second positive value during second-current durations. Alternatively, a probe signal may include two (or more) different negative values e.g., a first negative value during first-current durations and a second negative value during second-current durations.

Alternatively, a probe signal may be provided that has a first value during two first-current durations and a second value during one second-current duration. For example, a probe signal may be provided that includes two first-current durations 306 and one second-current duration 308, e.g., between the two first-current durations 306. Or, a probe signal may be provided that includes one first-current duration 306 and two second-current duration 308, e.g., the one first-current duration 306 between the two second-current durations 308.

Figure 4:
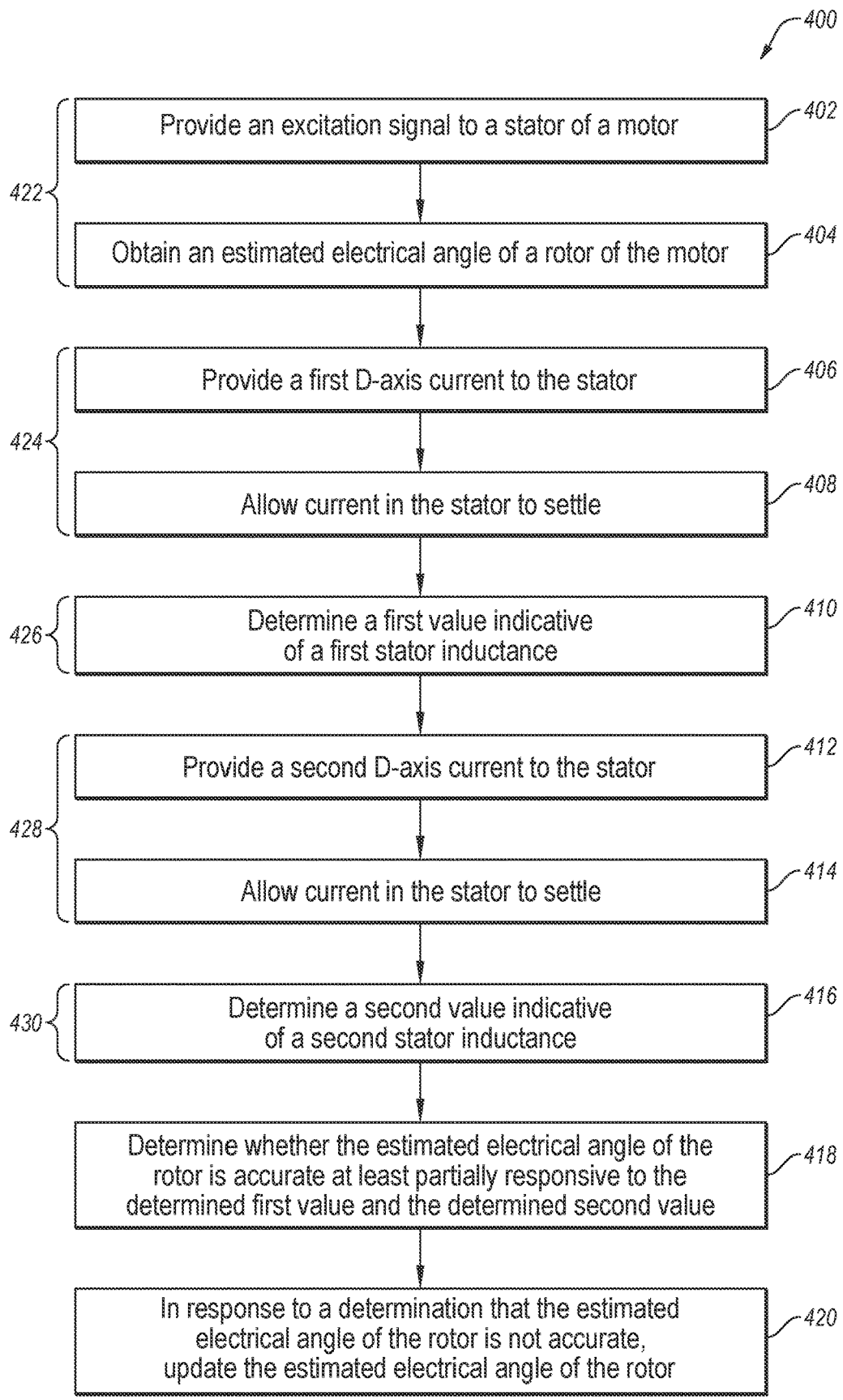
FIG. 4 is a flowchart of a method, according to one or more examples.

FIG. 4 is a flowchart of a method 400, according to one or more examples. At least a portion of method 400 may be performed, in some examples, by a device or system, such as apparatus 100 of FIG. 1, apparatus 500 of FIG. 5, apparatus 600 of FIG. 6, apparatus 700 of FIG. 7, circuits 702 of FIG. 7, or another device or system. Although illustrated as discrete blocks, various blocks may be divided into additional blocks, combined into fewer blocks, or eliminated, depending on the desired implementation.

In particular, example operations of method 400 are described with reference to apparatus 100 of FIG. 1 and to graphs 200 of FIG. 2 and time periods of FIG. 2.

At operation 402, an excitation signal may be provided to a stator of a motor. Operation 402 may occur during first time period 422, which may correspond to first time period 222 of FIG. 2. Excitation signal 150 of FIG. 1 may be an example of the excitation signal provided at operation 402.

At operation 404, an estimated electrical angle of a rotor of the motor may be obtained. Obtaining the electrical angle of the rotor may include an angle-estimation algorithm and allowing enough time after the angle-estimation algorithm has been enabled, for the resulting angle estimate to stabilize. Obtaining the electrical angle may include obtaining the electrical angle with sufficient accuracy that the electrical angle is valid for future operations of method 400. Operation 402 may occur during first time period 422, which may correspond to first time period 222 of FIG. 2. Alternatively, in some examples, the estimated electrical angle may be obtained during any subsequent time period. Estimated rotor electrical angle 220 of FIG. 2 or theta 146 of FIG. 1 may be an example of the estimated electrical angle obtained at operation 404. Phase-locked loop 116 of FIG. 1 may determine the estimated electrical angle.

At operation 406, a first d-axis current may be provided to the stator of the motor. Operation 406 may occur during second time period 424, which may correspond to second time period 224 of FIG. 2. Probe signal 152 of FIG. 1, probe signal 204 of FIG. 2 during second time period 224 and third time period 226, and probe signal 304 of FIG. 3 during first-current durations 306 may be examples of the first d-axis current provided at operation 406.

At operation 408, current in the stator may be allowed to settle. Operation 408 may occur during second time period 424, which may correspond to second time period 224 of FIG. 2.

During second time period 424, or during operation 406 and operation 408, the excitation signal of operation 402 may or may not continue to be provided. During third time period 426, or during operation 410, the excitation signal of operation 402 may continue to be provided or resume being provided.

At operation 410, a first value indicative of a first stator inductance may be determined. Operation 410 may occur during third time period 426, which may correspond to third time period 226 of FIG. 2. Accumulating delta Id 142 of FIG. 1 may be an example of determining the first value indicative of stator inductance.

At operation 412, a second d-axis current may be provided to the stator of the motor. Operation 412 may occur during fourth time period 428, which may correspond to fourth time period 228 of FIG. 2. Probe signal 152 of FIG. 1, probe signal 204 of FIG. 2 during at least a portion of fourth time period 228 and during fifth time period 230, and probe signal 304 of FIG. 3 during second-current durations 308 may be examples of the second d-axis current provided at operation 412.

At operation 414, current in the stator may be allowed to settle. Operation 414 may occur during fourth time period 428, which may correspond to fourth time period 228 of FIG. 2.

During fourth time period 428, or during operation 412 and operation 414, the excitation signal of operation 402 may or may not continue to be provided. During fifth time period 430, or during operation 416, the excitation signal of operation 402 may continue to be provided or resume being provided.

At operation 416, one or more second values indicative of a second stator inductance may be determined. Operation 416 may occur during fifth time period 430, which may correspond to fifth time period 230 of FIG. 2. Accumulating delta Id 142 of FIG. 1 may be an example of determining the second value indicative of stator inductance.

At operation 418, it may be determined whether the estimated electrical angle of the rotor is accurate at least partially responsive to the determined first value and the determined second value. As a non-limiting example, the first value (e.g., the first value indicative of the first stator inductance determined at operation 410) may be compared with the second value (e.g., the second value indicative of the second stator inductance determined at operation 416) to determine which is greater. Determining which of the first value and the second value is greater may lead to a determination regarding during which of the third time period 426 and the fifth time period 430 the stator inductance was greater. The stator saturation may be greater (and the inductance of the stator smaller) when the magnetic field resulting from the provided d-axis current of operation 406, or operation 412, is aligned with the magnetic field of the rotor. Thus, a determination regarding which of the first value or second value is greater may lead to a determination of whether the d-axis current of operation 406, or that of operation 412, is aligned with the rotor. For example, if the first value is greater than the second values, it may be determined that the rotor is aligned with the d-axis current in the positive direction, i.e., in the direction of the first d-axis current provided at operation 406 and that the estimated electrical angle is accurate. However, if the second value is greater than the first value, it may be determined that the rotor is aligned with the d-axis current in the negative direction, in the direction of the second d-axis current provided at operation 412, and that the estimated electrical angle is 180° off. Orientation indication 144 of FIG. 1 is an example of a signal indicating that the estimated electrical angle is either accurate or 180° off.

At operation 420, in response to a determination that the estimated electrical angle of the rotor is not accurate, the estimated electrical angle of the rotor may be updated. As a non-limiting example, phase-locked loop 116 of FIG. 1 may receive orientation indication 144 and may update the estimated electrical angle.

Modifications, additions, or omissions may be made to method 400 without departing from the scope of the present disclosure. For example, the operations of method 400 may be implemented in differing order. As another non-limiting example, in some examples, operation 406, operation 408, and operation 410 and operation 412, operation 414, and operation 416 may be repeated multiple times, e.g., in an interleaved fashion, e.g., as described above with regard to probe signal 304 of FIG. 3. In such examples, the probe signal may include first current during multiple first-current durations and a second current during multiple second-current duration. Furthermore, the outlined operations and actions are only provided as examples, and some of the operations and actions may be optional, combined into fewer operations and actions, or expanded into additional operations and actions without detracting from the essence of the disclosed example.

Figure 5:
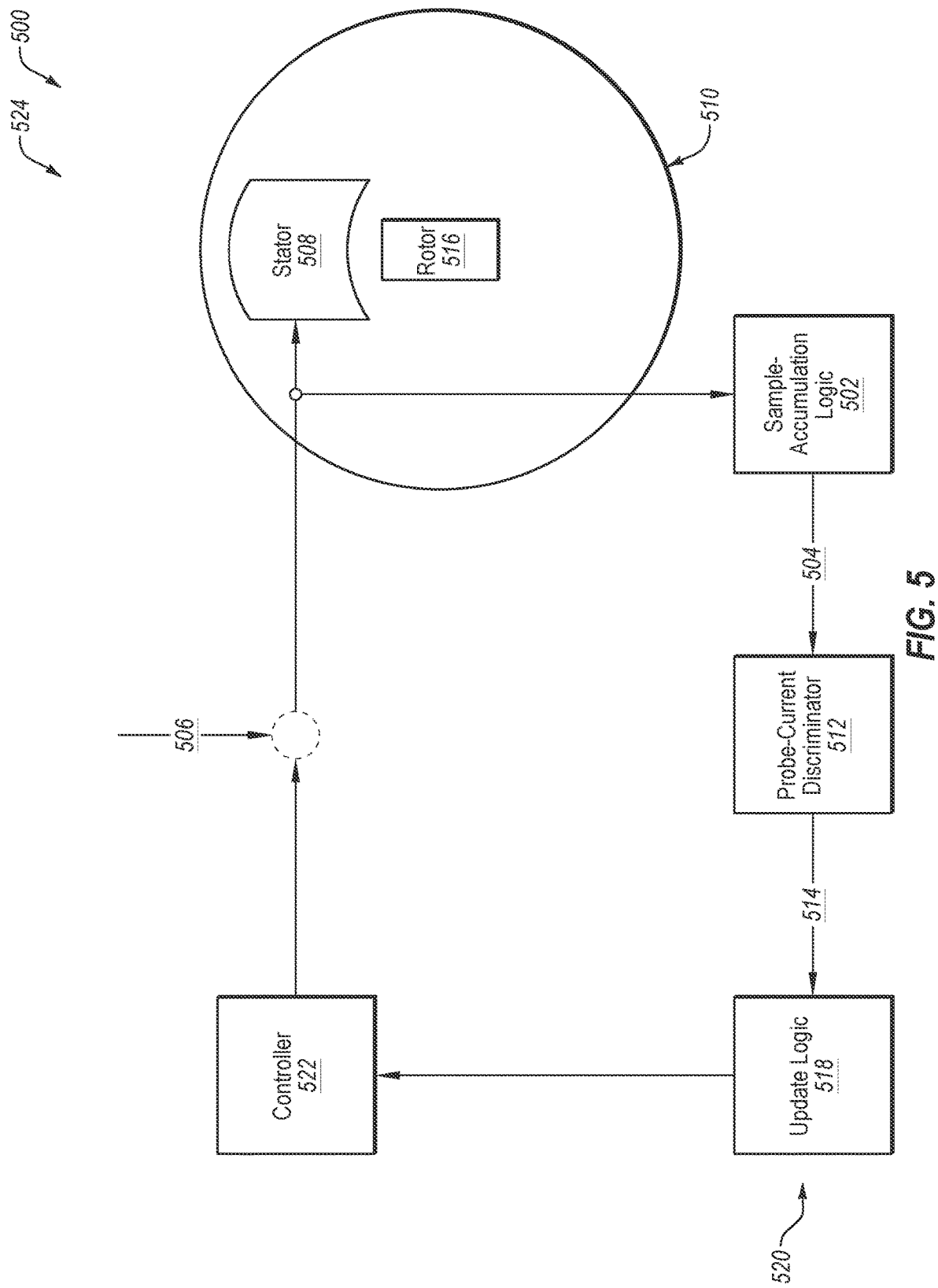
FIG. 5 is a functional block diagram illustrating an apparatus according to one or more examples.

FIG. 5 is a functional block diagram illustrating an apparatus 500 according to one or more examples. Apparatus 500 may include a sample-accumulation logic 502 to generate, over a time duration, a value 504 ("delta Id 504") indicative of inductance at least partially responsive to a probe signal 506 provided to a stator 508 of a motor 510. Apparatus 500 may include a probe-current discriminator 512 to generate a further value 514 ("orientation indication 514") indicative of an orientation indication of a rotor 516 of motor 510 at least partially responsive to the generated delta Id 504. Apparatus 500 may include update logic 518 to update a process variable 520 of a control loop 524, e.g., of a controller 522, at least partially responsive to a state of the further value (orientation indication 514).

Transform 110 or phase detector 112, or a combination thereof, may be examples of sample-accumulation logic 502. Delta Id 142 of FIG. 1 may be an example of delta Id 504. Probe signal 152 of FIG. 1, probe signal 204 of FIG. 2, or probe signal 304 of FIG. 3 may be examples of probe signal 506. Motor 102 may be an example of motor 510. Probe-current discriminator 114 of FIG. 1 may be an example of probe-current discriminator 512. Orientation indication 144 may be an example of orientation indication 514. Phase-locked loop 116 or velocity controller 104, or a combination thereof, may be examples of update logic 518. Velocity controller 104 of FIG. 1 and/or current controller 106 of FIG. 1 may be examples of controller 522 of FIG. 5. Velocity loop 122 or current loop 124 (both of FIG. 1) may be examples of control loop 524. Either or both of theta 146 of FIG. 1 and a state of current-loop integrator 158 of FIG. 1 may be an example of process variable 520.

Figure 6:
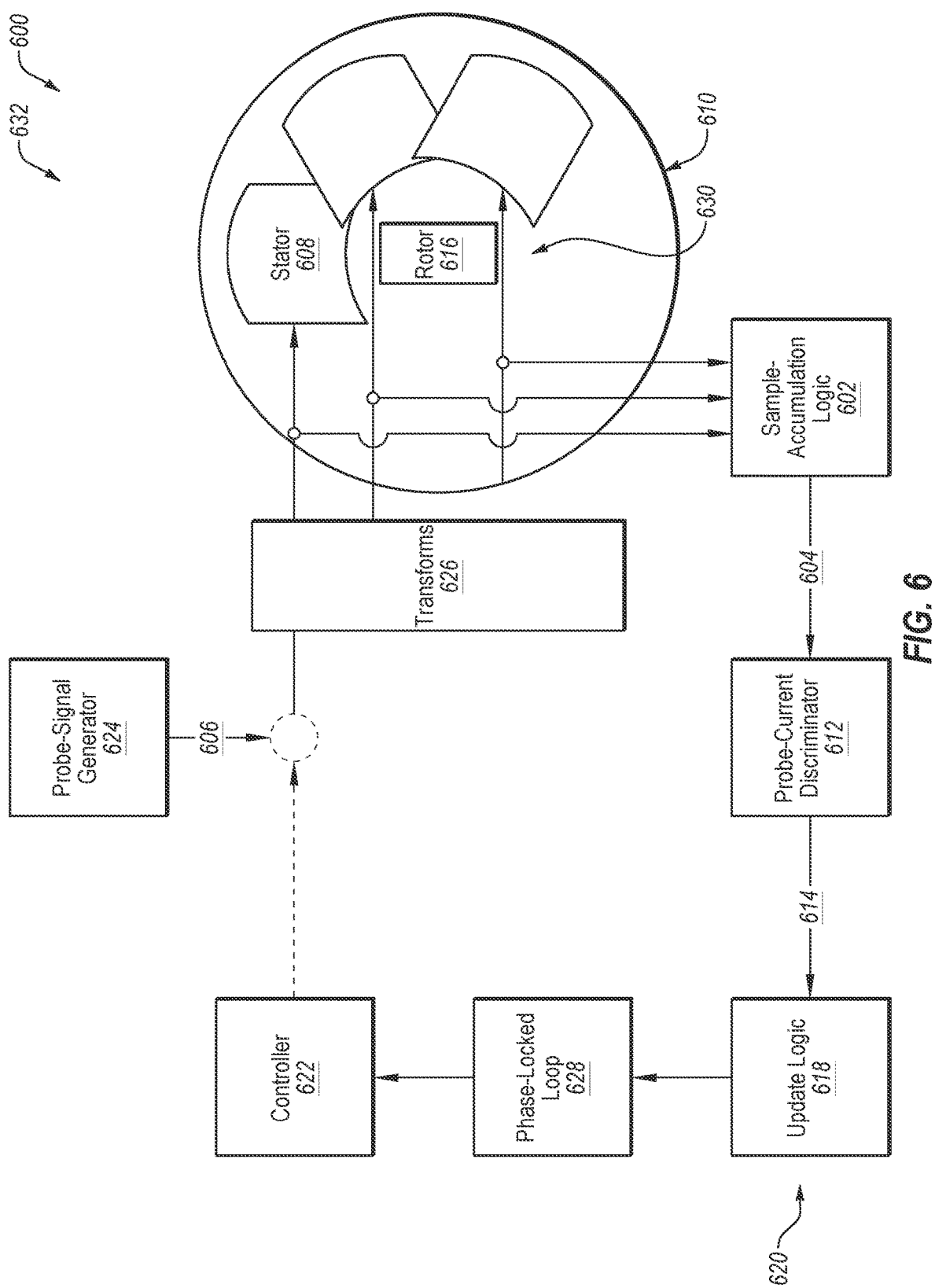
FIG. 6 is a functional block diagram illustrating an apparatus according to one or more examples.

FIG. 6 is a functional block diagram illustrating an apparatus 600 according to one or more examples. Apparatus 600 may include a sample-accumulation logic 602, a value 604, a probe signal 606, a stator 608, a motor 610 a probe-current discriminator 612, a further value 614, a rotor 616, an update logic 618, a process variable 620, a controller 622, a probe-signal generator 624, transforms 626, a phase-locked loop 628, an electrical angle 630 and a control loop 632.

Apparatus 600 may include sample-accumulation logic 602 to generate, over a time duration, value 604 ("delta Id 604") indicative of inductance at least partially responsive to probe signal 606 provided to stator 608 of motor 610. Apparatus 600 may include probe-current discriminator 612 to generate further value 614 ("orientation indication 614") indicative of an orientation indication of rotor 616 of motor 610 at least partially responsive to the generated delta Id 604. Apparatus 600 may include update logic 618 to update process variable 620 of control loop 632, e.g., of controller 622, at least partially responsive to a state of the further value (orientation indication 614).

Sample-accumulation logic 602 may be the same as, or may be substantially similar to, sample-accumulation logic 502 of FIG. 5. Delta Id 604 may be the same as, or may be substantially similar to, delta Id 504 of FIG. 5. Probe signal 606 may be the same as, or may be substantially similar to, probe signal 506 of FIG. 5. Stator 608 may be the same as, or may be substantially similar to, stator 508 of FIG. 5. Motor 610 may be the same as, or may be substantially similar to, motor 510 of FIG. 5. Probe-current discriminator 612 may be the same as, or may be substantially similar to, probe-current discriminator 512 of FIG. 5. Orientation indication 614 may be the same as, or may be substantially similar to, orientation indication 514 of FIG. 5. Rotor 616 may be the same as, or may be substantially similar to, rotor 516 of FIG. 5. Update logic 618 may be the same as, or may be substantially similar to, update logic 518 of FIG. 5. Process variable 620 may be the same as, or may be substantially similar to, process variable 520 of FIG. 5. Controller 622 may be the same as, or may be substantially similar to, controller 522 of FIG. 5. Control loop 632 may be the same as, or substantially similar to, control loop 524 of FIG. 5.

Probe-signal generator 118 of FIG. 1 may be an example of probe-signal generator 624 of FIG. 6. Transform 108 of FIG. 1 may be an example of transforms 626. Phase-locked loop 116 of FIG. 1 may be an example of phase-locked loop 628.

For illustrative purposes, three windings of stators 608 are illustrated in FIG. 6 as examples. Each of the three windings of stators 608 is illustrated receiving a respective input signal. Three respective response signals are illustrated being measured or received at the inputs to windings of stators 608. Stator windings opposite the three illustrated windings of stators 608 are not illustrated for simplicity, though in examples such stator windings may be included in motor 610.

Probe-signal generator 624 may generate the probe signal 606. Transforms 626 may provide the probe signal along a d-axis of the motor (e.g., along with a control signal, without limitation). In some examples, probe-signal generator 624 may generate the probe signal comprising first current during a first-current duration and a second current during a second-current duration, e.g., a positive current during a positive-current duration and a negative current during a negative-current duration.

Probe-current discriminator 612 may generate the further signal (orientation indication 614) by comparing a first value of the generated signal (e.g., the first value indicative of accumulated delta Id 604) indicative of inductance during the first-current duration to a second value of the generated signal (e.g., the second value indicative of accumulated delta Id 604) indicative of inductance during the second-current duration. In other words, probe-current discriminator 612 may compare the first value indicative of accumulated samples of delta Id 604 measured during the first-current duration to the second value indicative of accumulated samples of delta Id 604 measured during the second-current duration.

In some examples, probe signal 606 may include a first current during two or more first-current durations and a second current during one or more second-current durations. In some examples, the two or more first-current durations may be interleaved with the one or more second-current durations.

Phase-locked loop 628 may estimate an electrical angle 630 of the rotor 616. Update logic 618 may update the estimated electrical angle at least partially responsive to the orientation indication 614.

Figure 7:
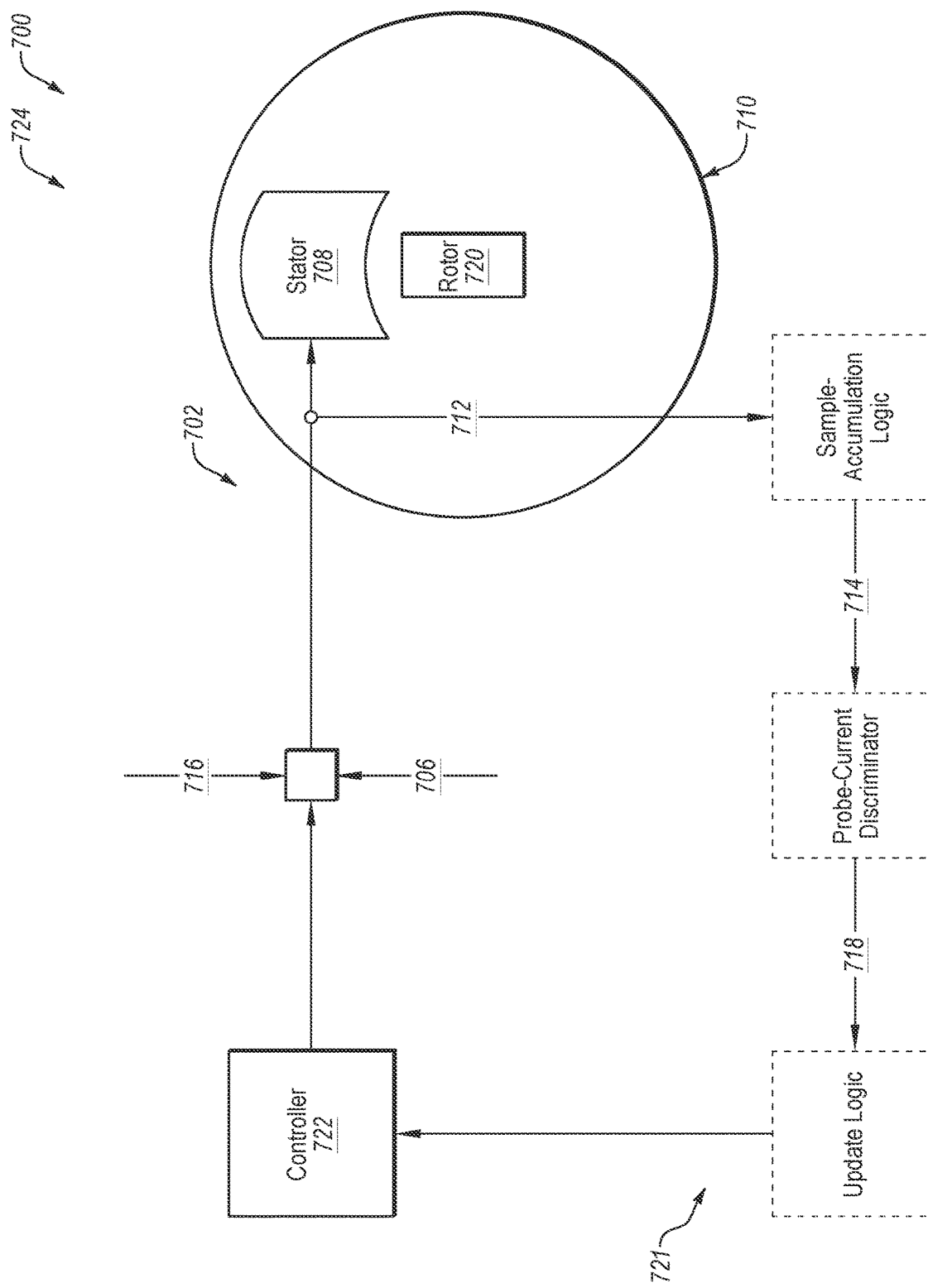
FIG. 7 is a functional block diagram illustrating an apparatus according to one or more examples.

FIG. 7 is a functional block diagram illustrating an apparatus 700 according to one or more examples.

Apparatus 700 may include one or more circuits 702. Circuits 702 may provide, responsive to a controller 722 (e.g., of a control loop 724), an oscillating signal 706 to a stator 708 of a motor 710 to induce a response signal 712. Circuits 702 may generate a signal 714 ("delta Id 714") indicative of inductance at least partially responsive to the induced response signal 712. Circuits 702 may observe, over a time duration, the generated delta Id 714 at least partially responsive to providing a probe signal 716 to stator 708. Circuits 702 may generate a further signal 718 ("orientation indication 718") indicative of an orientation indication of a rotor 720 of motor 710 at least partially responsive to the generated delta Id 714. Circuits 702 may update a process variable 721 of a controller 722, e.g., of control loop 724, at least partially responsive to a state of the further signal 718 (e.g., orientation indication 718).

Velocity controller 104, current controller 106, transform 108, transform 110, phase detector 112, probe-current discriminator 114, phase-locked loop 116, probe-signal generator 118, and excitation-signal generator 120 (all of FIG. 1), sample-accumulation logic 502, probe-current discriminator 512, update logic 518, or controller 522 (all of FIG. 5), sample-accumulation logic 602, probe-current discriminator 612, update logic 618, or controller 622 (all of FIG. 6) may be examples of circuits 702. Velocity loop 122 of FIG. 1, current loop 124 of FIG. 1, control loop 524 of FIG. 5, or control loop 632 of FIG. 6 may be examples of control loop 724. Motor 102 of FIG. 1, motor 510 of FIG. 5, or motor 610 of FIG. 6 may be examples of motor 710. Multi-phase response signal 136 of FIG. 1 may be an example of response signal 712. Idq 138 of FIG. 1, delta Id 142 of FIG. 1, delta Id 504 of FIG. 5, or delta Id 604 of FIG. 6 may be examples of delta Id 714. Probe signal 152 of FIG. 1, probe signal 204 of FIG. 2, probe signal 304 of FIG. 3, probe signal 506 of FIG. 5, or probe signal 606 of FIG. 6 may be examples of probe signal 716 of FIG. 7. Orientation indication 144 of FIG. 1, orientation indication 514 of FIG. 5, or orientation indication 614 of FIG. 6 may be examples of orientation indication 718. Oscillating signal 706 may be an example of excitation signal 150 of FIG. 1.

Between response signal 712 and delta Id 714, delta Id 714 and orientation indication 718, and following orientation indication 718 are three boxed illustrated using dashed lines. These three boxes may represent one or more circuits each. The three boxes are illustrated using dashed lines to indicate that they are optional in FIG. 7.

The box between response signal 712 and delta Id 714 may convert response signal 712 (e.g., as measured at the inputs of stator 708, without limitation) into delta Id 714 (e.g., a d-axis current indicative of inductance of rotor 720, without limitation). Transform 110 of FIG. 1, phase detector 112 of FIG. 1, sample-accumulation logic 502, of FIG. 5, or sample-accumulation logic 602, of FIG. 6 may be examples of elements that make up the box between response signal 712 and delta Id 714.

Additionally or alternatively, the box between delta Id 714 and orientation indication 718 may determine orientation indication 718 based on delta Id 714. As a non-limiting example, the box between delta Id 714 and orientation indication 718 may accumulate one or more samples of delta Id 714 over two respective time periods (e.g., including a first-current duration and a second-current duration) and may compare the one or more samples from the two respective time periods to determine orientation indication 718. Phase detector 112, probe-current discriminator 114 of FIG. 1, probe-current discriminator 512, of FIG. 5, or probe-current discriminator 612 of FIG. 6 may be examples of elements that make up the box between delta Id 714 and orientation indication 718.

The box following orientation indication 718 may be an element of control loop 724 including or using process variable 721. Phase-locked loop 116 of FIG. 1, velocity controller 104 of FIG. 1, update logic 518 of FIG. 5, update logic 618 of FIG. 6, or phase-locked loop 628 of FIG. 6 may be examples of elements that make up the box following orientation indication 718.

Figure 8:
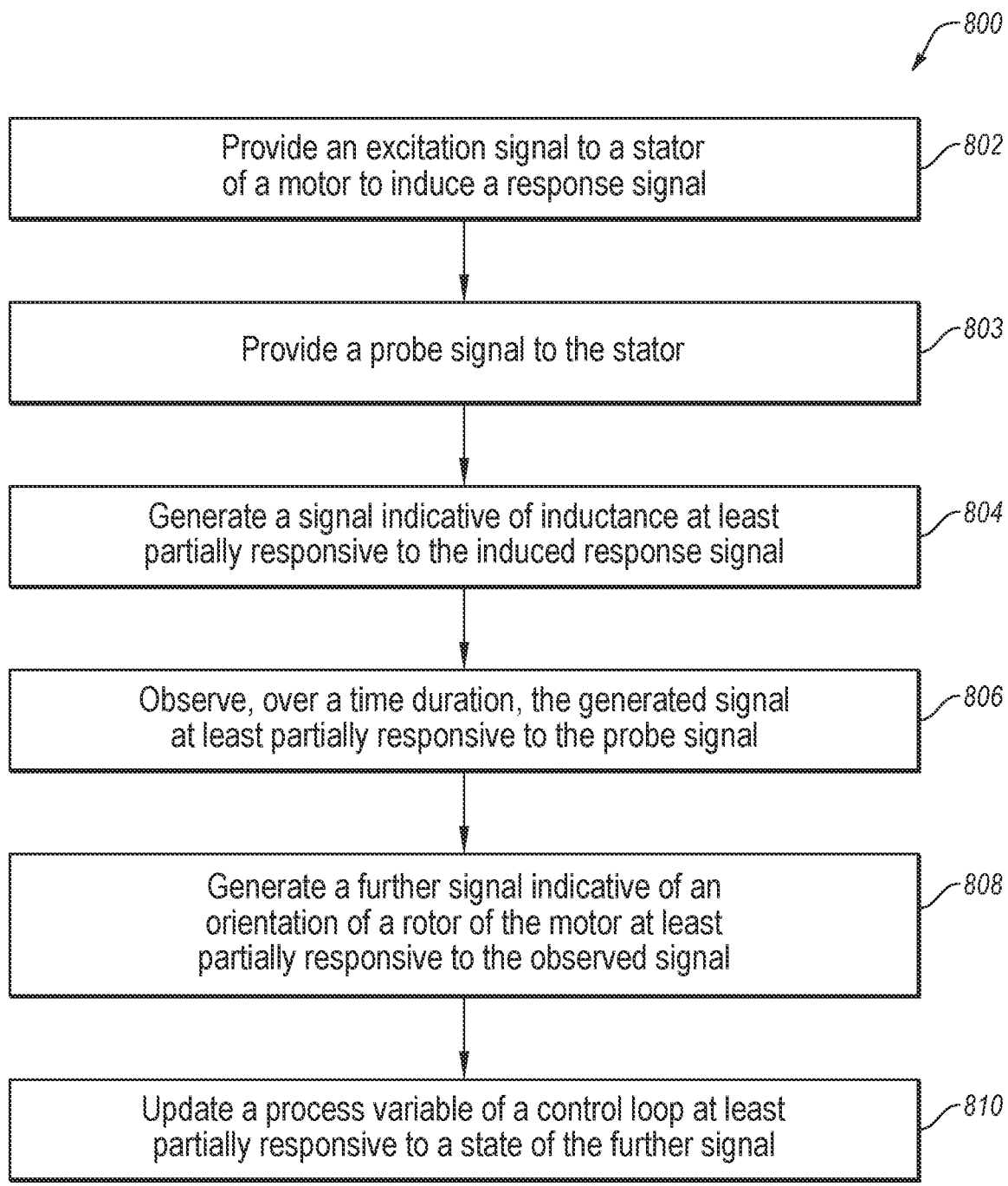
FIG. 8 is a flowchart of another method according to one or more examples.

FIG. 8 is a flowchart of another method 800, in accordance with one or more examples. At least a portion of method 800 may be performed, in some examples, by a device or system, such as apparatus 100 of FIG. 1, apparatus 500 of FIG. 5, apparatus 600 of FIG. 6, apparatus 700 of FIG. 7, circuits 702 of FIG. 7, or another device or system. Although illustrated as discrete blocks, various blocks may be divided into additional blocks, combined into fewer blocks, or eliminated, depending on the desired implementation.

At operation 802, an excitation signal may be provided to a stator of a motor to induce a response signal. Excitation signal 150 of FIG. 1, generated by excitation-signal generator 120 of FIG. 1 may be an example of the excitation signal provided at operation 802. Additionally any or all of current command signal 128, voltage command signal 130, and control signal 132 may be provided at operation 802. In some examples, any or all of excitation-signal generator 120, current command signal 128, voltage command signal 130, and control signal 132 may be provided at least partially responsive to a control loop (e.g., responsive to velocity loop 122 of FIG. 1, control loop 524 of FIG. 5, control loop 632 of FIG. 6, or control loop 724 of FIG. 7, without limitation). Motor 102 of FIG. 1, motor 510 of FIG. 5, motor 610 of FIG. 6, or motor 710 of FIG. 7 may be examples of the motor of operation 802. Multi-phase response signal 136 of FIG. 1, d-axis current 208 of FIG. 2, d-axis current 312 of FIG. 3, or response signal 712 of FIG. 7 may be examples of the response signal of operation 802.

At operation 803, a probe signal may be provided to the stator. Probe signal 152 of FIG. 1, generated by probe-signal generator 118 of FIG. 1, probe signal 204 of FIG. 2, probe signal 304 of FIG. 3, probe signal 506 of FIG. 5, probe signal 606 of FIG. 6, generated by probe-signal generator 624 of FIG. 6, or probe signal 716 of FIG. 7 may be examples of the probe signal of operation 803.

At operation 804, a signal indicative of inductance may be generated at least partially responsive to the induced response signal. Idq 138 of FIG. 1, generated by transform 110 of FIG. 1, delta Id 504 of FIG. 5, generated by sample-accumulation logic 502 of FIG. 5, delta Id 604 of FIG. 6, generated by sample-accumulation logic 602 of FIG. 6, or delta Id 714 of FIG. 7 may be examples of the signal indicative of inductance of operation 804.

At operation 806, the generated signal indicative of inductance may be observed, over a time duration, at least partially responsive to the probe signal. Delta Id 142 of FIG. 1, generated by phase detector 112 of FIG. 1, demodulated d-axis current 216 of FIG. 2, delta Id 504 of FIG. 5, generated by sample-accumulation logic 502 of FIG. 5, delta Id 604 of FIG. 6, generated by sample-accumulation logic 602 of FIG. 6, or delta Id 714 of FIG. 7 may be examples of the observed generated signal of operation 806.

At operation 808, a further signal indicative of an orientation indication of a rotor of the motor may be generated at least partially responsive to the observed generated signal. Orientation indication 144 of FIG. 1, generated by probe-current discriminator 114 of FIG. 1, orientation indication 514 of FIG. 5, generated by probe-current discriminator 512 of FIG. 5, orientation indication 614 of FIG. 6, generated by probe-current discriminator 612 of FIG. 6, or orientation indication 718 may be examples of the orientation indication of operation 808.

At operation 810, a process variable of a control loop may be updated at least partially responsive to a state of the further signal. Process variable 520 of FIG. 5, process variable 620, of FIG. 6, or process variable 721, of FIG. 7 may be examples of the process variable of operation 810. Velocity loop 122 of FIG. 1, current loop 124 of FIG. 1, control loop 524 of FIG. 5, control loop 632 of FIG. 6, or control loop 724 of FIG. 7 may be examples of the control loop of operation 810.

FIG. 9A and FIG. 9B collectively are a flowchart of yet another method 900 according to one or more examples. At least a portion of method 900 may be performed, in some examples, by a device or system, such as apparatus 100 of FIG. 1, apparatus 500 of FIG. 5, apparatus 600 of FIG. 6, apparatus 700 of FIG. 7, circuits 702 of FIG. 7, or another device or system. Although illustrated as discrete blocks, various blocks may be divided into additional blocks, combined into fewer blocks, or eliminated, depending on the desired implementation.

At operation 902, an estimate of an electrical angle of a rotor of a motor may be obtained. Obtaining the electrical angle of the rotor may include an angle-estimation algorithm and allowing enough time after the angle-estimation algorithm has been enabled for the resulting angle estimate to stabilize. Obtaining the electrical angle may include obtaining the electrical angle with sufficient accuracy that the electrical angle is valid for future operations of method 900. As a non-limiting example, a commutation angle estimator or a phase-locked loop (e.g., phase-locked loop 116 of FIG. 1, without limitation) may generate an estimated electrical angle of the rotor. Theta 146 of FIG. 1, may be an example of the estimated electrical angle of operation 902. Motor 102 of FIG. 1, motor 510 of FIG. 5, motor 610 of FIG. 6, or motor 710 of FIG. 7 may be examples of the motor of operation 902.

At operation 904 an excitation signal may be provided to a stator of a motor to induce a response signal. Excitation signal 150 of FIG. 1, generated by excitation-signal generator 120 of FIG. 1 may be an example of the excitation signal provided at operation 904. Additionally any or all of current command signal 128, voltage command signal 130, and control signal 132 may be provided at operation 904. In some examples, any or all of excitation-signal generator 120, current command signal 128, voltage command signal 130, and control signal 132 may be provided at least partially responsive to a control loop (e.g., responsive to velocity loop 122 of FIG. 1, control loop 524 of FIG. 5, control loop 632 of FIG. 6, or control loop 724 of FIG. 7, without limitation). Motor 102 of FIG. 1, motor 510 of FIG. 5, motor 610 of FIG. 6, or motor 710 of FIG. 7 may be examples of the motor of operation 904. Multi-phase response signal 136 of FIG. 1, d-axis current 208 of FIG. 2, d-axis current 312 of FIG. 3, or response signal 712 of FIG. 7 may be examples of the response signal of operation 904.

At operation 906, a probe signal comprising a first current during a first-current duration and a second current during a second-current duration may be generated. In some examples, the first current and the second current may be nonzero and have opposite signs. In other examples, the first current and the second current may be nonzero and have the same sign and different amplitudes. Probe signal 152 of FIG. 1, probe signal 204 of FIG. 2, probe signal 304 of FIG. 3, probe signal 506 of FIG. 5, probe signal 606 of FIG. 6, or probe signal 716 of FIG. 7 may be examples of the probe signal of operation 906.

At operation 908, the probe signal may be provided along a d-axis of the motor. The probe signal may be provided in addition to the excitation signal (e.g., the excitation signal of operation 904) and/or in addition to other signals described with regard to operation 904.

According to operation 914, providing the probe signal (e.g., the providing of operation 908, without limitation) comprises providing a first current during two or more first-current durations and providing a second current during one or more second-current durations (e.g., the probe signal may be as generated according to operation 906, without limitation). Probe signal 304 of FIG. 3 illustrates an example of the probe signal of operation 914 including a first current (e.g., a positive current) during first-current durations 306 and a second current (e.g., a negative current) during second-current durations 308. The first current and the second current may have the same sign, or may have opposite signs.

At operation 916, the one or more second-current durations may be interleaved with the two or more first-current durations. Probe signal 304 of FIG. 3 illustrates an example of the probe signal of operation 916 including interleaved multiple first-current durations 306 and multiple second-current durations 308. In other examples a first-current duration may be between two second-current durations.

At operation 918 a signal indicative of inductance may be generated at least partially responsive to the induced response signal (e.g., the response signal induced at operation 904). The signal indicative of inductance may be generated during the first current-durations and during the second current durations. During the first current durations, the signal indicative of inductance may be indicative inductance during the first current durations and during the second current durations, the signal indicative of inductance may be indicative inductance during the second current durations. Idq 138 of FIG. 1, generated by transform 110 of FIG. 1, delta Id 504 of FIG. 5, generated by sample-accumulation logic 502 of FIG. 5, delta Id 604 of FIG. 6, generated by sample-accumulation logic 602 of FIG. 6, or delta Id 714 of FIG. 7 may be examples of the signal indicative of inductance of operation 804.

At operation 920 the generated signal indicative of inductance may be observed, over a time duration, at least partially responsive to providing a probe signal to the stator. The time duration may encompass the first current durations and the second current durations. Delta Id 142 of FIG. 1, generated by phase detector 112 of FIG. 1, demodulated d-axis current 216 of FIG. 2, delta Id 504 of FIG. 5, generated by sample-accumulation logic 502 of FIG. 5, delta Id 604 of FIG. 6, generated by sample-accumulation logic 602 of FIG. 6, or delta Id 714 of FIG. 7 may be examples of the observed generated signal of operation 806. Probe signal 152 of FIG. 1, generated by probe-signal generator 118 of FIG. 1, probe signal 204 of FIG. 2, probe signal 304 of FIG. 3, probe signal 506 of FIG. 5, probe signal 606 of FIG. 6, generated by probe-signal generator 624 of FIG. 6, or probe signal 716 of FIG. 7 may be examples of the probe signal of operation 806.

At operation 922, a first portion of the observed signal indicative of inductance during the first-current duration (e.g., the first-current duration of operation 906, or during two or more first-current durations of operation 914 and/or operation 916) may be compared to a second portion of the observed signal indicative of inductance during the second-current duration (e.g., the second-current duration of operation 906, or during one or more second-current durations of operation 914 and/or operation 916). A portion of demodulated d-axis current 216 of FIG. 2, during third time period 226 of FIG. 2, may be an example of the first portion of operation 922. Further, a portion of demodulated d-axis current 216 during fifth time period 230 of FIG. 2 may be an example of the second portion of operation 922.

At operation 924 a further signal indicative of an orientation of a rotor of the motor may be generated at least partially responsive to the observed generated signal. The generation of the orientation indication may be determined responsive to a comparison between durations of the observed generated signal, e.g., as described with regard to operation 922. Orientation indication 144 of FIG. 1, generated by probe-current discriminator 114 of FIG. 1, orientation indication 514 of FIG. 5, generated by probe-current discriminator 512 of FIG. 5, orientation indication 614 of FIG. 6, generated by probe-current discriminator 612 of FIG. 6, or orientation indication 718 may be examples of the orientation indication of operation 808.

At operation 926 a process variable of a control loop may be updated at least partially responsive to a state of the further signal. Process variable 520 of FIG. 5, process variable 620, of FIG. 6, or process variable 721, of FIG. 7 may be examples of the process variable of operation 810. Velocity loop 122 of FIG. 1, current loop 124 of FIG. 1, control loop 524 of FIG. 5, control loop 632 of FIG. 6, or control loop 724 of FIG. 7 may be examples of the control loop of operation 926.

At operation 928, an estimated electrical angle of the rotor may be updated at least partially responsive to the orientation of the rotor. Theta 146 updated by phase-locked loop 116 responsive to orientation indication 144 may be an example of the estimated electrical angle of operation 928.

At operation 930, a state of a current-loop integrator may be updated responsive to the orientation of the rotor. A state of current-loop integrators 158 of FIG. 1 may be an example of the state updated at operation 930.

Modifications, additions, or omissions may be made to method 800 or method 900 without departing from the scope of the present disclosure. For example, the operations of method 800 or method 900 may be implemented in differing order. Furthermore, the outlined operations and actions are only provided as examples, and some of the operations and actions may be optional, combined into fewer operations and actions, or expanded into additional operations and actions without detracting from the essence of the disclosed example.

FIG. 10 is a block diagram of a device 1000 that, in one or more examples, may be used to implement various functions, operations, acts, processes, or methods disclosed herein. Device 1000 includes one or more processors 1002 (sometimes referred to herein as "processors 1002") operably coupled to one or more apparatuses such as data storage devices (sometimes referred to herein as "storage 1004"), without limitation. Storage 1004 includes machine-executable code 1006 stored thereon (e.g., stored on a computer-readable memory, without limitation) and processors 1002 include logic circuitry 1008. Machine-executable code 1006 includes information describing functional elements that may be implemented by (e.g., performed by, without limitation) logic circuitry 1008. Logic circuitry 1008 implements (e.g., performs, without limitation) the functional elements described by machine-executable code 1006. Device 1000, when executing the functional elements described by machine-executable code 1006, should be considered as special purpose hardware that may carry out the functional elements disclosed herein. In one or more examples, processors 1002 may perform the functional elements described by machine-executable code 1006 sequentially, concurrently (e.g., on one or more different hardware platforms, without limitation), or in one or more parallel process streams.

When implemented by logic circuitry 1008 of processors 1002, machine-executable code 1006 may adapt processors 1002 to perform operations of examples disclosed herein. For example, machine-executable code 1006 may adapt processors 1002 to perform at least a portion or a totality of method 400 of FIG. 4, method 800 of FIG. 8, or method 900 of FIG. 9A and FIG. 9B. As another example, machine-executable code 1006 may adapt processors 1002 to perform at least a portion or a totality of the operations discussed for apparatus 100 of FIG. 1, graphs 200 of FIG. 2, graphs 300 of FIG. 3, apparatus 500, of FIG. 5, apparatus 600 of FIG. 6, apparatus 700, of FIG. 7, and more specifically, one or more of velocity controller 104 of FIG. 1, current controller 106 of FIG. 1, transform 108 of FIG. 1, transform 110 of FIG. 1, phase detector 112 of FIG. 1, probe-current discriminator 114 of FIG. 1, phase-locked loop 116 of FIG. 1, probe-signal generator 118 of FIG. 1, excitation-signal generator 120 of FIG. 1, sample-accumulation logic 502 of FIG. 5, probe-current discriminator 512 of FIG. 5, update logic 518 of FIG. 5, sample-accumulation logic 602 of FIG. 6, probe-current discriminator 612 of FIG. 6, update logic 618 of FIG. 6, or circuits 702 of FIG. 7.

Processors 1002 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes computing instructions (e.g., software code, without limitation) related to examples. It is noted that a general-purpose processor (may also be referred to herein as a host processor or simply a host) may be a microprocessor, but in the alternative, processors 1002 may include any conventional processor, controller, microcontroller, or state machine. Processors 1002 may also be implemented as a combination of computing devices, such as a combination of a DSP and a microprocessor, a plurality of microprocessors, one or more microprocessors in conjunction with a DSP core, or any other such configuration.

In one or more examples, storage 1004 includes volatile data storage (e.g., random-access memory (RAM), without limitation), non-volatile data storage (e.g., Flash memory, a hard disc drive, a solid state drive, erasable programmable read-only memory (EPROM), without limitation). In one or more examples, processors 1002 and storage 1004 may be implemented into a single device (e.g., a semiconductor device product, a system on chip (SOC), without limitation). In one or more examples, processors 1002 and storage 1004 may be implemented into separate devices.

In one or more examples, machine-executable code 1006 may include computer-readable instructions (e.g., software code, firmware code, without limitation). By way of non-limiting example, the computer-readable instructions may be stored by storage 1004, accessed directly by processors 1002, and executed by processors 1002 using at least logic circuitry 1008. Also by way of non-limiting example, the computer-readable instructions may be stored on storage 1004, transmitted to a memory device (not shown) for execution, and executed by processors 1002 using at least logic circuitry 1008. Accordingly, in one or more examples, logic circuitry 1008 includes electrically configurable logic circuitry.

In one or more examples, machine-executable code 1006 may describe hardware (e.g., circuitry, without limitation) to be implemented in logic circuitry 1008 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 1008 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in one or more examples, machine-executable code 1006 may include an HDL, an RTL, a GL description, a mask level description, other hardware description, or any combination thereof.

In examples where machine-executable code 1006 includes a hardware description (at any level of abstraction), a system (not shown, but including storage 1004) may implement the hardware description described by machine-executable code 1006. By way of non-limiting example, processors 1002 may include a programmable logic device (e.g., a field programmable gate array (FPGA) or a PLC, without limitation) and the logic circuitry 1008 may be electrically controlled to implement circuitry corresponding to the hardware description into logic circuitry 1008. Also by way of non-limiting example, logic circuitry 1008 may include hard-wired logic manufactured by a manufacturing system (not shown, but including storage 1004) according to the hardware description of machine-executable code 1006.

Regardless of whether machine-executable code 1006 includes computer-readable instructions or a hardware description, logic circuitry 1008 performs the functional elements described by machine-executable code 1006 when implementing the functional elements of machine-executable code 1006. It is noted that although a hardware description may not directly describe functional elements, a hardware description indirectly describes functional elements that the hardware elements described by the hardware description are capable of performing.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used in the present disclosure, the terms "module" or "component" may refer to specific hardware implementations may perform the actions of the module or component or software objects or software routines that may be stored on or executed by general purpose hardware (e.g., computer-readable media, processing devices, without limitation) of the computing system. In one or more examples, the different components, modules, engines, and services described in the present disclosure may be implemented as objects or processes that execute on the computing system (e.g., as separate threads, without limitation). While some of the system and methods described in the present disclosure are generally described as being implemented in software (stored on or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation). As used herein, "each" means "some or a totality." As used herein, "each and every" means "a totality."

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, without limitation" or "one or more of A, B, and C, without limitation." is used, in general such a construction is intended to include A alone, B alone, C alone, A and B together, A and C together, B and C together, or A, B, and C together, without limitation.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure may include:

Example 1: An apparatus comprising: sample-accumulation logic to generate, over a time duration, a value indicative of inductance at least partially responsive to a probe signal provided to a stator of a motor; a probe-current discriminator to generate a further value indicative of an orientation of a rotor of the motor at least partially responsive to the generated value; and update logic to update a process variable of a control loop at least partially responsive to a state of the further value.

Example 2: The apparatus according to Example 1, comprising a probe-signal generator to generate the probe signal and a transform to provide the probe signal along a d-axis of the motor.

Example 3: The apparatus according to any of Examples 1 and 2, comprising a probe-signal generator to generate the probe signal, the probe signal comprising a first current during a first-current duration and a second current during a second-current duration.

Example 4: The apparatus according to any of Examples 1 through 3, wherein the first current and the second current are nonzero and have opposite signs.

Example 5: The apparatus according to any of Examples 1 through 4, wherein the probe-current discriminator is to generate the further value by comparing a first value indicative of inductance during the first-current duration to a second value indicative of inductance during the second-current duration.

Example 6: The apparatus according to any of Examples 1 through 5, wherein the probe signal comprises the first current during two or more first-current durations and the second current during one or more second-current durations.

Example 7: The apparatus according to any of Examples 1 through 6, wherein the two or more first-current durations are interleaved with the one or more second-current durations.

Example 8: The apparatus according to any of Examples 1 through 7, comprising a phase-locked loop to estimate an electrical angle of the rotor wherein the update logic is to update the estimated electrical angle at least partially responsive to the orientation of the rotor of the motor.

Example 9: A method comprising: providing an excitation signal to a stator of a motor to induce a response signal; providing a probe signal to the stator; generating a signal indicative of inductance at least partially responsive to the induced response signal; observing, over a time duration, the generated signal at least partially responsive to the provided probe signal; generating a further signal indicative of an orientation of a rotor of the motor at least partially responsive to the observed signal; and updating a process variable of a control loop at least partially responsive to a state of the further signal.

Example 10: The method according to Example 9, comprising providing the probe signal along a d-axis of the motor.

Example 11: The method according to any of Examples 9 and 10, comprising generating the probe signal comprising a first current during a first-current duration and a second current during a second-current duration.

Example 12: The method according to any of Examples 9 through 11, wherein the first current and the second current are nonzero and have opposite signs.

Example 13: The method according to any of Examples 9 through 12, wherein generating the further signal comprises comparing a first portion of the observed signal indicative of inductance during the first-current duration to a second portion of the observed signal indicative of inductance during the second-current duration.

Example 14: The method according to any of Examples 9 through 13, wherein providing the probe signal to the stator comprises providing a first current during two or more first-current durations and providing a second current during one or more second-current durations.

Example 15: The method according to any of Examples 9 through 14, interleaving the two or more first-current durations with the one or more second-current durations.

Example 16: The method according to any of Examples 9 through 15, wherein updating the process variable comprises updating an estimated electrical angle of the rotor at least partially responsive to the orientation of the rotor.

Example 17: The method according to any of Examples 9 through 16, wherein updating the process variable comprises updating a state of a current-loop integrator responsive to the orientation of the rotor.

Example 18: An apparatus comprising: one or more circuits to: provide, responsive to a controller, an oscillating signal to a stator of a motor to induce a response signal; generate a signal indicative of inductance at least partially responsive to the induced response signal; observe, over a time duration, the generated signal at least partially responsive to providing a probe signal to the stator; generate a further signal indicative of an orientation of a rotor of the motor at least partially responsive to the observed signal; and update a process variable of a control loop at least partially responsive to the further signal.

Example 19: The apparatus according to Example 18, wherein the one or more circuits generate the probe signal comprising a first current during a first-current duration and a second current during a second-current duration.

Example 20: The apparatus according to any of Examples 18 and 19, wherein the one or more circuits compare a first signal of the observed signal indicative of inductance during the first-current duration to a second signal of the observed signal indicative of inductance during the second-current duration.

Example 21: The apparatus according to any of Examples 18 through 20, wherein the one or more circuits apply the probe signal to the stator comprising providing a first current during one or more first-current durations and providing a second current during one or more second-current durations.

While the present disclosure has been described with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus comprising:
   sample-accumulation logic to generate, over a time duration, a value indicative of inductance at least partially responsive to a probe signal provided to a stator of a motor;
   a probe-current discriminator to generate a further value indicative of an orientation of a rotor of the motor at least partially responsive to the generated value; and
   update logic to update, at a commutation angle estimator or a phase-locked loop, an estimated electrical angle of a rotor at least partially responsive to a state of the further value indicating the orientation of the rotor to be off by 180°.

2. The apparatus of claim 1, comprising a probe-signal generator to generate the probe signal and a transform to provide the probe signal along a d-axis of the motor.

3. The apparatus of claim 1, comprising a probe-signal generator to generate the probe signal, the probe signal comprising a first current during a first-current duration and a second current during a second-current duration.

4. The apparatus of claim 3, wherein the first current and the second current are nonzero and have opposite signs.

5. The apparatus of claim 3, wherein the probe-current discriminator is to generate the further value by comparing a first value indicative of inductance during the first-current duration to a second value indicative of inductance during the second-current duration.

6. The apparatus of claim 3, wherein the probe signal comprises the first current during two or more first-current durations and the second current during one or more second-current durations.

7. The apparatus of claim 6, wherein the two or more first-current durations are interleaved with the one or more second-current durations.

8. The apparatus of claim 1, wherein the update logic is to adjust, at the commutation angle estimator or the phase-locked loop, the estimated electrical angle by 180° at least partially responsive to the state of the further value indicating the orientation of the rotor to be off by 180°.

9. A method comprising:
   providing an excitation signal to a stator of a motor to induce a response signal;
   providing a probe signal to the stator;
   generating a signal indicative of inductance at least partially responsive to the induced response signal;
   observing, over a time duration, the generated signal at least partially responsive to the provided probe signal;
   generating a further signal indicative of an orientation of a rotor of the motor at least partially responsive to the observed signal; and
   updating, at a commutation angle estimator or a phase-locked loop, an estimated electrical angle of a rotor at least partially responsive to a state of the further signal indicating the orientation of the rotor to be off by 180°.

10. The method of claim 9, comprising providing the probe signal along a d-axis of the motor.

11. The method of claim 9, comprising generating the probe signal comprising a first current during a first-current duration and a second current during a second-current duration.

12. The method of claim 11, wherein the first current and the second current are nonzero and have opposite signs.

13. The method of claim 11, wherein generating the further signal comprises comparing a first portion of the observed signal indicative of inductance during the first-current duration to a second portion of the observed signal indicative of inductance during the second-current duration.

14. The method of claim 9, wherein providing the probe signal to the stator comprises providing a first current during two or more first-current durations and providing a second current during one or more second-current durations.

15. The method of claim 14, interleaving the two or more first-current durations with the one or more second-current durations.

16. The method of claim 9, wherein updating the estimated electrical angle comprises adjusting, at the commutation angle estimator or the phase-locked loop, the estimated electrical angle by 180°.

17. The method of claim 9, wherein updating the process variable comprises updating a state of a current-loop integrator responsive to the orientation of the rotor.

18. An apparatus comprising:
one or more circuits to:
provide, responsive to a controller, an oscillating signal to a stator of a motor to induce a response signal;
generate a signal indicative of inductance at least partially responsive to the induced response signal;
observe, over a time duration, the generated signal at least partially responsive to providing a probe signal to the stator;
generate a further signal indicative of an orientation of a rotor of the motor at least partially responsive to the observed signal; and
update, at a commutation angle estimator or a phase-locked loop, an estimated electrical angle of a rotor at least partially responsive to the further signal indicating the orientation of the rotor to be off by 180°,
wherein the update to the estimated electrical angle adjusts the estimated electrical angle of the rotor by 180°.

19. The apparatus of claim 18, wherein the one or more circuits generate the probe signal comprising a first current during a first-current duration and a second current during a second-current duration.

20. The apparatus of claim 19, wherein the one or more circuits compare a first signal of the observed signal indicative of inductance during the first-current duration to a second signal of the observed signal indicative of inductance during the second-current duration.

21. The apparatus of claim 18, wherein the one or more circuits apply the probe signal to the stator comprising providing a first current during one or more first-current durations and providing a second current during one or more second-current durations.

* * * * *